US008442025B2

(12) United States Patent
Borsella et al.

(10) Patent No.: US 8,442,025 B2
(45) Date of Patent: May 14, 2013

(54) METHODS AND APPARATUS FOR CONTROLLING DISCONTINUOUS RECEPTION

(75) Inventors: Remo Borsella, Waterloo (CA); Dinesh Kumar Arora, Kitchener (CA)

(73) Assignee: Research In Motion Limited, Waterloo (CA)

( * ) Notice: Subject to any disclaimer, the term of this patent is extended or adjusted under 35 U.S.C. 154(b) by 350 days.

(21) Appl. No.: 12/856,273

(22) Filed: Aug. 13, 2010

(65) Prior Publication Data

US 2011/0038348 A1 Feb. 17, 2011

Related U.S. Application Data

(60) Provisional application No. 61/234,074, filed on Aug. 14, 2009.

(51) Int. Cl.
*H04J 3/24* (2006.01)
(52) U.S. Cl.
USPC .......................................... 370/349; 370/311
(58) Field of Classification Search .................. 370/310, 370/230, 311, 349; 455/13.4, 574, 343.1, 455/343.2, 343.5
See application file for complete search history.

(56) References Cited

U.S. PATENT DOCUMENTS 8,121,045 B2* 2/2012 Cai et al. ........................ 370/252
2010/0118815 A1* 5/2010 Kim et al. ...................... 370/329

OTHER PUBLICATIONS

International Bureau, "International Preliminary Report on Patentability", Issued in international application No. PCT/CA2010/001234, Dated Feb. 14, 2012, 7 pages.

3GPP TS 44.060 V9.0.0 (May 2009) "3rd Generation Partnership Project: Technical Specification Group GSM/EDGE Radio Access Network; General Packet Radio Service (GPRS): Mobile Station (MS)—Base Station System (BSS) interface; Radio Link Control/Medium Access Control (RLC/MAC) protocol (Release 9)", 3rd Generation Partnership Project, May 2009, 586 pages—in "International Preliminary Report on Patentability", Issued in international application No. PCT/CA2010/001234, Dated Feb. 14, 2012.
3GPP TS 24.008 V8.6.0 (Jun. 2009) "3rd Generation Partnership Project;Technical Specification Group Core Network and Terminals; Mobile radio interface Layer 3 specification; Core network protocols; Stage 3 (Release 8)", 3rd Generation Partnership Project, Jun. 2009, 582 pages—in "International Preliminary Report on Patentability", Issued in international application No. PCT/CA2010/001234, Dated Feb. 14, 2012.
International Searching Authority, "Written Opinion of the International Searching Authority", Issued in international application No. PCT/CA2010/001234, Dated Nov. 22, 2010, 5 pages.
International Searching Authority, "International Search Report", Issued in international application No. PCT/CA2010/001234, Dated Nov. 22, 2010, 2 pages.
3GPP TSG GERAN WG2 Meeting #43BIS, "Optimized DRX mode definition and evaluation", Tdoc G2-090168 Agenda item 5.3.7, Oct. 21-23, 2009, Sophia Antipolis, France, 6 pages—"International Search Report", Issued in international application No. PCT/CA2010/001234, Dated Sep. 9, 2010.

* cited by examiner

*Primary Examiner* — Brenda H Pham
(74) *Attorney, Agent, or Firm* — Hanley, Flight & Zimmerman, LLC

(57) ABSTRACT

Methods and apparatus for controlling discontinuous reception (DRX) in mobile devices are disclosed. An example method for controlling discontinuous reception includes entering a packet transfer mode, receiving a network message that indicates that the mobile station is to utilize an optimized DRX mode, and entering DRX mode immediately upon leaving packet transfer mode.

19 Claims, 16 Drawing Sheets

METHODS AND APPARATUS FOR CONTROLLING DISCONTINUOUS RECEPTION

RELATED APPLICATIONS

This patent claims the benefit of U.S. Provisional Patent Application Ser. No. 61/234,074, filed on Aug. 14, 2009, and entitled "METHODS AND APPARATUS FOR CONTROLLING DISCONTINUOUS RECEPTION." The disclosure of U.S. Provisional Patent Application Ser. No. 61/234,074 is hereby incorporated by reference herein in its entirety.

FIELD OF THE DISCLOSURE

This disclosure relates generally to mobile communications and, more particularly, to methods and apparatus for controlling discontinuous reception.

BACKGROUND

In GSM (global system for mobile communications)/GPRS (general packet radio service)/EDGE (enhanced data rate for GSM evolution) networks, a number of common control channels are defined within the air interface between the mobile station (MS) and the base station transceiver (BTS). Common control channels (CCCH) and packet common control channels (PCCCH) support common procedures required to establish a dedicated link with the network. Typical channels include the RACH (Random Access Procedure), PCH (Paging Channel), and AGCH (Access Grant Channel) within GSM. In GPRS/EDGE, the common control channels include the PRACH (Packet Random Access Channel), PPCH (Packet Paging Channel) and PAGCH (Packet Access Grant Channel)

There are several paging subchannels in the same physical channel carrying the CCCH identified by a CCCH_GROUP or on the same PDCH carrying the PCCCH identified by a PCCCH_GROUP. The mobile station determines its own paging subchannel for paging block decoding according to the parameter PAGING_GROUP. This paging subchannel is defined as a set of multiframes carrying the CCCH or the PCCCH. Such set of multiframes defines the periodicity at which the mobile station is required to decode paging messages. There are two parameters used to determine such periodicity: BS_PA_MFRMS for the CCCH logical channels and SPLIT_PG_CYCLE for the PCCCH logical channels and, optionally, for the CCCH.

The BS_PA_MFRMS basically defines the number of 51-multiframes for the PCH periodicity. Its value is broadcasted on the BCCH and it can take values between 2 and 9.

The SPLIT_PG_CYCLE defines the occurrence of paging blocks on the PDCH carrying the PCCCH, or, optionally, on the CCCH, belonging to the mobile station in discontinuous reception (DRX) mode.

In order to minimize the power consumption, when in idle mode, the mobile station is not required to listen to all the (P)PCH logical channel occurrences. In DRX mode, the mobile station shall listen to the blocks corresponding to its paging group as defined by the different PAGING_GROUP values. In non-DRX mode, depending on whether there are or are not PCCCH channel(s) in the cell, the mobile station shall listen: to all blocks per multiframe where paging may appear on a PCCCH channel or to all blocks on a CCCH channel. Because the mobile station must undertake more listening in non-DRX mode, non-DRX mode utilizes more power and, thereby, consumes the battery of the mobile station more quickly.

Third generation partnership project (3GPP) standards specify five scenarios when the mobile station shall enter a non-DRX mode period (3GPP TS 44.060):

1. At the transition from packet transfer mode to packet idle mode, the mobile station shall enter the transfer non-DRX mode period.
2. At the transition from the dual transfer mode to the dedicated mode or packet idle mode, the mobile station shall enter the transfer non-DRX mode period.
3. A mobile station operating in network control cell reselection (NC2) mode shall enter the NC2 non-DRX mode period when it sends a network control (NC) measurement report.
4. When initiating the mobility management (MM) procedures for GPRS attach and routing area update defined in 3GPP TS 24.008, the mobile station shall enter the MM non-DRX mode period.
5. When mobile station receives a pre-notification for a multimedia broadcast/multicast service (MBMS) service and MBMS session, the mobile station shall enter the MBMS non-DRX mode.

During a GPRS attach procedure, the mobile station requests values for the SPLIT_PG_CYCLE and NON_DRX_TIMER parameters to be applied on CCCH or PCCCH. Specifically, the NON_DRX_TIMER parameter controls the duration of the non-DRX mode period to be applied by the mobile station when it has left the packet transfer mode or the dual transfer mode and then enters the packet idle mode.

After a temporary block flow (TBF) release, the mobile station reverts to the non-DRX mode, in which it must decode all CCCH or PCCCH blocks, independently of its DRX period. This allows a faster downlink TBF establishment in the case the network needs to initiate a new downlink TBF, because it can send the downlink TBF allocation on any (P)CCCH related to the (P)CCCH_GROUP of the mobile station, and does not have to wait for the MS paging subchannel in order to send the paging message.

After a TBF release, the non-DRX period is equal to the minimum of the two following values: DRX_TIMER_MAX, set by the network and given on broadcast channels and NON_DRX_TIMER, set by mobile station during the GPRS attach procedure. The non-DRX timer may be set to account for a high probability that a new downlink TBF will need to be established a short time after the end of an uplink TBF, a downlink TBF, and/or both an uplink and a downlink running simultaneously. For instance, where the uplink TBF is used to send a request, a downlink TBF may be established for the transfer of the response. There may be a latency period between two consecutive internet protocol (IP) packets sent to a given mobile station. This means in some cases that several downlink TBFs are needed to send consecutive IP packets to the mobile station. The non-DRX mode has an impact on mobile station autonomy in idle mode because, in this period, the mobile station must continuously decode the CCCH or the PCCCH blocks.

FIG. 1 illustrates an example message flow between a mobile station 102 and a network 104. During a first time period, the network has established a downlink TBF 108 and the mobile station 102 is in packet transfer mode 106. During this time, the network sends, via the downlink TBF 108, a plurality of radio link control (RLC)/media access control (MAC) data packets including logical link control (LLC) data. A final packet sent from the network includes a final bit indicator (FBI) set to 1 to indicate that all data has been sent.

After the FBI is received, the DL TBF is released and the non-DRX period 112 begins. The mobile station enters packet idle non-DRX mode 110 and the network enters non-DRX period 112. At the expiration of the non-DRX timer, the non-DRX mode period 110/112 ends and the mobile station enters packet idle DRX mode 114.

The nature of IP traffic usually leads to the frequent setup and release of the radio resources (more specifically TBFs), which results in increased signaling load and inefficiency in data transfer. In fact, setting-up and releasing a TBF takes significant time and radio resources. Unnecessary TBF setup and release can be avoided by delaying the release of the TBF using delayed DL TBF. More specifically, in the downlink direction, during an inactive period (e.g., when no data packets are waiting to be sent) the connection is maintained by periodically sending dummy LLC frames in the downlink direction.

In uplink direction, extended UL TBF procedures allow the UL TBF to be maintained during inactivity periods (when the MS does not have RLC information to send) and the network determines the release of the UL TBF. In contrast, in UL TBF non-extended mode, once the RLC output data queue reaches a specific threshold, a countdown procedure is initiated, and will lead to the release of the UL TBF even if new RLC blocks have to be sent after the countdown procedure started. Accordingly, a new UL TBF will need to be established to send any further RLC output data.

DETAILED DESCRIPTION

Figure 1:
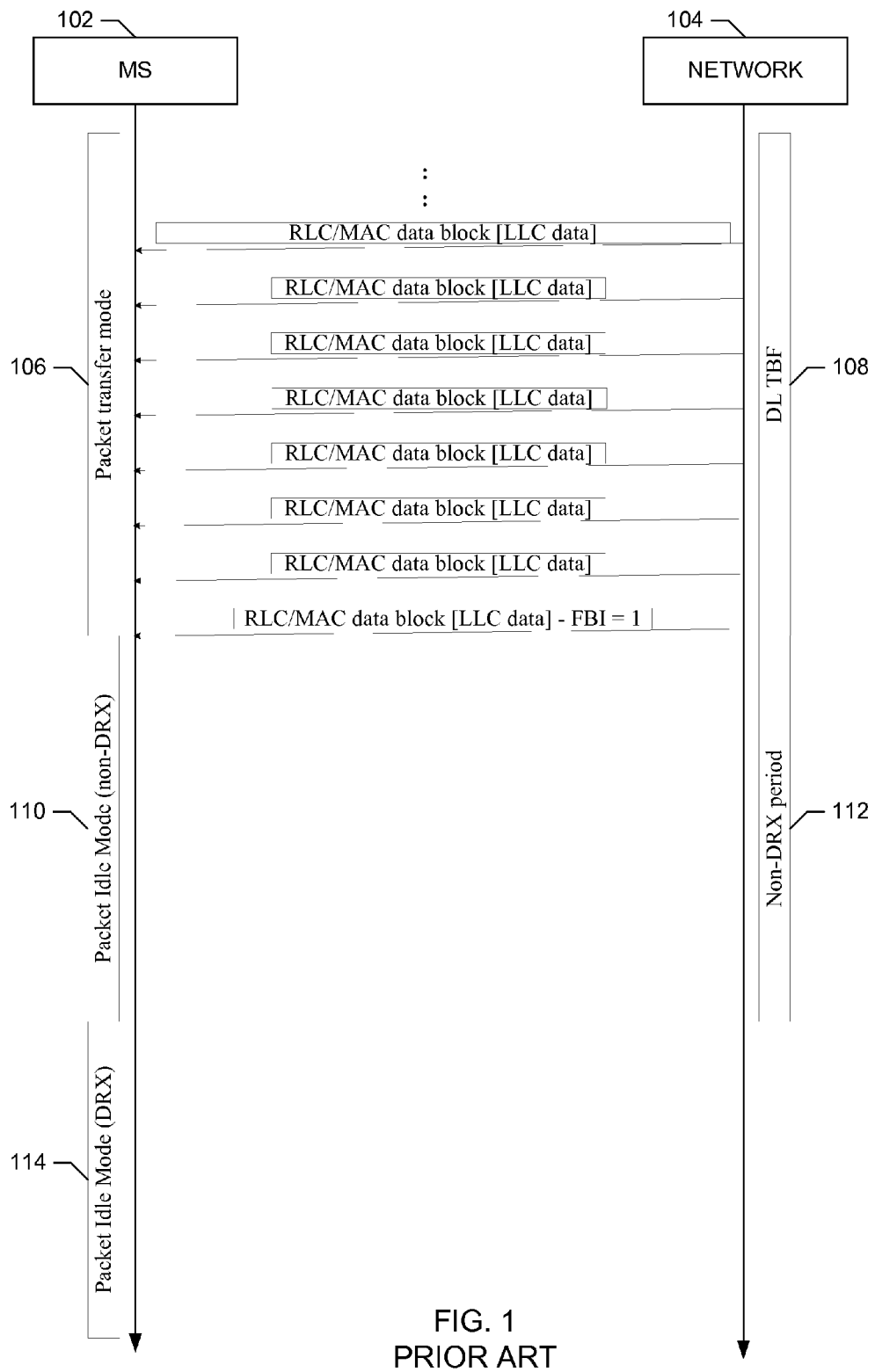
FIG. 1 illustrates an example message flow between a mobile station and a network.

In a mobile system such as a general packet radio service (GPRS) system, a Non-discontinuous reception (DRX) timer indicates the duration of a non-DRX mode period to be applied by a mobile station when the mobile station leaves a packet transfer mode or a dual transfer mode. Non-DRX mode enables the mobile station in Packet Idle mode to remain in full common controls channels (CCCH) state, packet CCCH (PCCCH) state, or channel monitoring state and enables faster packet data session establishment than processing a paging based packet data session setup. However, non-DRX mode uses more power than DRX idle mode. In other words, when a MS is powered by a battery, the battery will be drained more quickly. Thus, a tradeoff must be made between shortening the non-DRX timer to conserve battery power and lengthening the non-DRX timer to allow a new data session to be quickly established.

Example methods and apparatus disclosed herein enable control of the operation of the non-DRX operation mode of a mobile station based on conditions at a mobile station and one or more connected networks. In some example implementations, adjustments to the duration of a Non-DRX timer are made to balance battery usage with data speed. In other implementations, the initiation of the non-DRX timer is controlled based on user inputs. As described herein, control of the non-DRX operation mode may be based on any available information including, for example, network capabilities, data transfer modes, data transmission characteristics, application requirements, battery charge levels, user input, etc.

While example methods and apparatus described herein are described in conjunction with GPRS communication systems, the disclosed methods and apparatus could be implemented in a communication system implemented according to any architecture such as, for example, universal mobile telecommunications system (UMTS), long term evolution (LTE), worldwide interoperability for microwave access (WiMAX), code division multiple access (CDMA), etc.

Methods and apparatus for controlling discontinuous reception (DRX) are described. In an example implementation, a mobile station may include hardware and software stored on a tangible computer readable medium that, during operation, cause the mobile station to receive a network message from a network, wherein the network message includes an optimized discontinuous reception (DRX) mode indication that indicates that the mobile station is to operate in optimized DRX mode and when the optimized DRX mode indication has been received and a temporary block flow (TBF) is released, enter packet idle mode in DRX mode. For example, in some implementations, the mobile station shall enter non-DRX mode period at a transition from a packet transfer mode to a packet idle mode unless the network has signalled "Optimized DRX mode." In some implementations, the mobile station shall enter non-DRX mode period at a transition from dual transfer mode to dedicated mode or packet idle mode, unless the network has signalled "Optimized DRX mode." In some implementations, the network message is at least one of a packet downlink assignment message, a multiple TBF downlink assignment message, a packet uplink assignment message, or a packet timeslot reconfigure message. In some implementations, the optimized DRX mode indication has a value of a 1 when the mobile station is to operate in optimized DRX mode and a value of 0 when the mobile station is not to operate in optimized DRX mode. In some implementations, the optimized DRX mode indication is an OPTIMIZED_DRX_MODE parameter.

In an example implementation, a method to control discontinuous reception, the method comprises receiving a network message from a network, wherein the network message includes an optimized discontinuous reception (DRX) mode indication that indicates that a mobile station is to operate in optimized DRX mode and when the optimized DRX mode indication has been received and a temporary block flow (TBF) is released, entering packet idle mode in DRX mode at the mobile station. In some implementations, the network message is at least one of a packet downlink assignment message, a multiple TBF downlink assignment message, a packet uplink assignment message, or a packet timeslot reconfigure message. In some implementations, the optimized DRX mode indication has a value of a 1 when the mobile station is to operate in optimized DRX mode and a value of 0 when the mobile station is not to operate in optimized DRX mode. In some implementations, the optimized DRX mode indication is an OPTIMIZED_DRX_MODE parameter.

In some implementations, apparatus and/or machine readable media storing instructions may be executed to cause a machine to implement the forgoing methods and systems.

In an example implementation, a network apparatus may include hardware and software stored on a tangible computer readable medium that during operation cause the network apparatus to provide a network message to a mobile station, the network message including an optimized discontinuous reception (DRX) mode indication that indicates that the mobile station is to operate in optimized DRX mode. In some implementations, the network message is at least one of a packet downlink assignment message, a multiple TBF downlink assignment message, a packet uplink assignment message, or a packet timeslot reconfigure message. In some implementations, the optimized DRX mode indication has a value of a 1 when the mobile station is to operate in optimized DRX mode and a value of 0 when the mobile station is not to operate in optimized DRX mode. In some implementations, the optimized DRX mode indication is an OPTIMIZED_DRX_MODE parameter.

In an example implementation, a method to control discontinuous reception, the method may include providing a network message to a mobile station, the network message including an optimized discontinuous reception (DRX) mode indication that indicates that the mobile station is to operate in optimized DRX mode. In some implementations, the network message is at least one of a packet downlink assignment message, a multiple TBF downlink assignment message, a packet uplink assignment message, or a packet timeslot reconfigure message. In some implementations, the optimized DRX mode indication has a value of a 1 when the mobile station is to operate in optimized DRX mode and a value of 0 when the mobile station is not to operate in optimized DRX mode. In some implementations, the optimized DRX mode indication is an OPTIMIZED_DRX_MODE parameter.

In an example implementation, a mobile station may include hardware and software stored on a tangible computer readable medium that, during operation, cause the mobile station to determine that a temporary block flow (TBF) session is at least one of an extended uplink TBF or a delayed downlink TBF and store in a tangible memory a non-discontinuous reception (DRX) timer setting of zero when the TBF session is at least one of the extended uplink TBF or the delayed downlink TBF. In some implementations, the instructions cause the mobile station to determine that a TBF session is the delayed downlink TBF by counting dummy packets received at the mobile station. In some implementations, the instructions cause the mobile station to determine that a TBF session is a delayed downlink TBF by counting packets received at the mobile station to determine a packet count and when the packet count exceeds a threshold, determine that the TBF session is the delayed downlink TBF. In some implementations, the packets are dummy packets.

In an example implementation, mobile station may include hardware and software stored on a tangible computer readable medium that, during operation, cause the mobile station to count packets received at the mobile station during a temporary block flow session (TBF) to determine a packet count, determine an amount of time that passes between a first time that the packet count reaches a threshold until the TBF session is released, receive a non-discontinuous reception (DRX) timer setting, and store in a tangible memory a reduced non-DRX timer setting equal to the non-DRX timer setting minus the amount of time. In some implementations, the packets are dummy packets.

In an example implementation, a mobile station may include hardware and software stored on a tangible computer readable medium that, during operation, cause the mobile station to receive a battery level indication for the mobile station, determine a non-DRX timer setting based on the battery level, and store the non-DRX timer setting in a tangible memory. In some implementations, the instructions further cause the mobile station to receive application quality of service information for an application executing at the mobile station and determine the non-DRX timer setting based on the battery level and the quality of service information. In some implementations, the instructions cause the mobile station to determine the non-DRX timer setting by increasing the non-DRX timer setting based on the quality of service information, initiating a timer for the increased non-DRX timer setting, and when the timer expires, decreasing the non-DRX timer setting. In some implementations, the instructions cause the mobile station to determine the non-DRX timer setting to be zero when the battery level is below a threshold.

In an example implementation, a mobile station may include hardware and software stored on a tangible computer readable medium that, during operation, cause the mobile station to receive a user input indicating a requested non-DRX operation mode, determine a non-DRX timer setting based on the user input, and store the non-DRX timer setting in a tangible memory. In some implementations, the user input may be a long battery life setting, a fast access setting, a mixed mode setting, or an optimized access battery setting.

Figure 2:
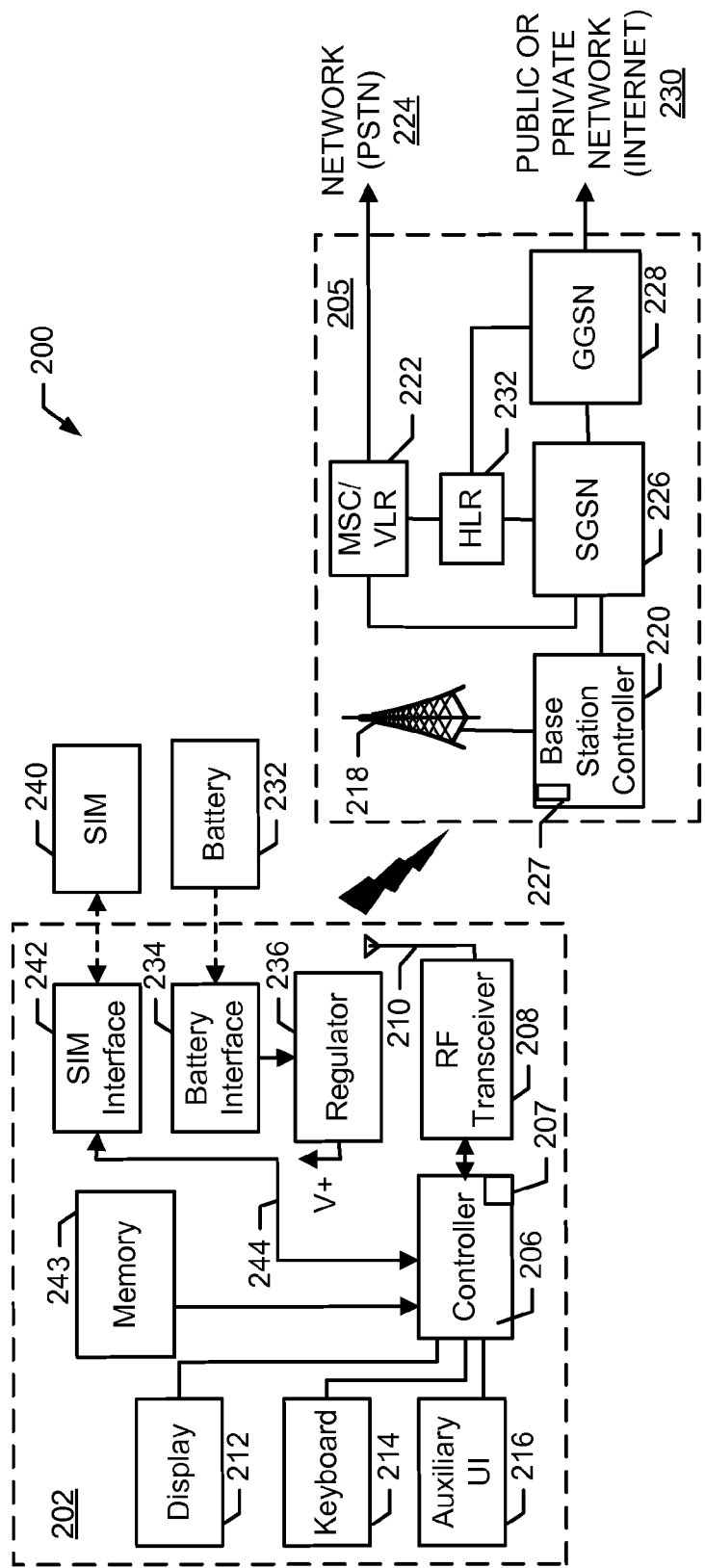
FIG. 2 is a block diagram of an example system that supports control of the non-DRX mode at an example mobile station.

FIG. 2 is a block diagram of an example system 200 that supports control of the non-DRX mode at an example mobile station 202. According to the illustrated example, the mobile station 202 communicates with a wireless communication network 204. As described in detail herein, the mobile station 202 includes functionality to determine when the wireless communication network 204 supports mobile station control of the non-DRX operation mode.

The mobile station 202 (one type of user equipment, wireless or mobile communication device) communicates through a wireless communication network 204. In the example of FIG. 2, the mobile station 202 includes a visual display 212, a keyboard 214, and perhaps one or more auxiliary user interfaces (UI) 216, each of which are coupled to a controller 206. The controller 206 is also coupled to a radio frequency (RF) transceiver circuitry 208, which is further coupled to an antenna 210. In one example, the controller 206 is implemented using a central processing unit (CPU) that runs operating system software stored in a memory 243. The controller 206 will normally control overall operation of mobile station 202, whereas signal processing operations associated with communication functions are typically performed by the RF transceiver circuitry 208 that may include, for example, a digital signal processor (DSP). The controller 206 interfaces with the display 212 to present received information, stored information, user inputs, and the like.

The example controller 206 includes a DRX control module 207 to control the operation of the non-DRX mode at the mobile station 202. The DRX control module 207 monitors the operation of the mobile station 202, information from the network 204, and user input to optimize the use of non-DRX mode. The operation of the DRX control module 207 is described in further detail in conjunction with FIGS. 3 to 25.

The keyboard 214, which may be a telephone type keypad or full alphanumeric keyboard, is normally provided for entering data for storage in the mobile station 202, information for transmission to the network 204, a telephone number to place a telephone call, commands to be executed on the mobile station 202, and possibly other or different user inputs. The keyboard 214 may be a full or partial keyboard or keypad and be a physical keyboard or any type of keyboard representation such as a touchscreen.

Mobile station 202 sends communication signals to, and receives communication signals from the network 204 over a wireless link via the antenna 210. The RF transceiver circuitry 208 performs, for example, modulation/demodulation, encoding/decoding, and encryption/decryption. It will be apparent to those skilled in art that RF transceiver circuitry 208 will be adapted to particular wireless network or networks in which mobile station 202 is intended to operate.

The mobile station 202 further includes a battery interface 234 for receiving one or more rechargeable batteries 232. The battery 232 provides power to electrical circuitry in mobile station 202, and the battery interface 234 provides for a mechanical and electrical connection for the battery 232. The battery interface 234 is coupled to a regulator 236 that regulates power V+ to the device. When the mobile station 202 is operational, an RF transmitter of the RF transceiver circuitry 208 is typically keyed or turned on only when it is sending information to the network, and is otherwise turned off to conserve resources. Similarly, an RF receiver of the RF transceiver circuitry 208 is typically periodically turned off to conserve power until it is needed to receive signals or information (if at all) during designated time periods.

The mobile station 202 operates using a Subscriber Identity Module (SIM) 240 that is connected to or inserted in the mobile station 202 at a SIM interface 242. Without the SIM 240, the mobile station 202 may be referred to as mobile equipment (ME); with the SIM 240, the mobile station 202 may be referred to as user equipment (UE). The SIM 240 is one type of a removable memory module or "smart card" used to identify an end user of mobile station 202 (or subscriber) and to personalize the device, among other things. Without the SIM 240, the example mobile station 202 is not fully operational for communication through the wireless network 204. By inserting the SIM 240 into the mobile station 202, an end user can have access to any and all of his/her subscribed services.

The SIM 240 generally includes a processor and memory for storing information. Because the SIM 240 is coupled to the SIM interface 242, it is coupled to the controller 206 through communication lines 244. To identify the subscriber, the SIM 240 contains some user parameters such as an International Mobile Subscriber Identity (IMSI). An advantage of using the SIM 240 is that end users are not necessarily bound by any single physical mobile station because the SIM 240 may be used in any number of different mobile stations. The SIM 240 may store additional user information for the mobile station 202 as well, including datebook (or calendar) information, recent call information, and network connection information.

The mobile station 202 may be a single unit, such as a data communication device, a cellular telephone, a multiple-function communication device with data (e.g., electronic mail, internet access, personal information management, etc.) and voice communication capabilities, a personal digital assistant (PDA) enabled for wireless communication, or a computer incorporating an internal modem. Alternatively, the mobile station 202 may be a multiple-module unit comprising a plurality of separate components, including but in no way limited to a computer or other device connected to a wireless modem. In particular, for example, in the mobile station block diagram of FIG. 2, the RF transceiver circuitry 208 and antenna 210 may be implemented as a radio modem unit that may be inserted into a port on a laptop computer. In this case, the laptop computer would include the display 212, keyboard 214, one or more auxiliary UIs 216, and the controller 206 may be the computer's CPU. It is also contemplated that a computer or other equipment not normally capable of wireless communication may be adapted to connect to and effectively assume control of the RF transceiver circuitry 208 and the antenna 210 of a single-unit device such as one of those described above.

The mobile station 202 communicates in and through the wireless communication network 204, which may be a cellular telecommunications network. In the example of FIG. 2, the wireless network 204 is configured in accordance with General Packet Radio Service (GPRS) and a Global Systems for Mobile (GSM) technologies. The wireless network 204 may be configured according to any communication technology including, for example, UMTS, LTE, WiMAX, CDMA, etc. The wireless communication network 204 includes a base station controller (BSC) 220 with an associated tower station 218, a Mobile Switching Center (MSC) 222, a Home Location Register (HLR) 232, a Serving General Packet Radio Service (GPRS) Support Node (SGSN) 226, and a Gateway GPRS Support Node (GGSN) 228. The MSC 222 is coupled to the BSC 220 and to a landline network, such as a Public Switched Telephone Network (PSTN) 224. The SGSN 226 is coupled to the BSC 220 and to the GGSN 228, which is in turn coupled to a public or private data network 230 (such as the Internet). The HLR 232 is coupled to the MSC 222, the SGSN 226, and the GGSN 228. The wireless communication network 204 may include additional components or may not include all of the listed components based on, for example, the communication technology for the wireless communication network 204.

The station 218 is a fixed transceiver station, and the station 218 and the BSC 220 may be referred to as transceiver equipment. The transceiver equipment provides wireless network coverage for a particular coverage area commonly referred to as a "cell." The transceiver equipment transmits communication signals to, and receives communication signals from, mobile stations within its cell via station 218. The transceiver equipment normally performs such functions as modulation and possibly encoding and/or encryption of signals to be transmitted to the mobile station 202 in accordance with particular, usually predetermined, communication protocols and parameters, under control of its controller. The transceiver equipment similarly demodulates and possibly decodes and decrypts, if necessary, any communication signals received from mobile station 202 within its cell. Communication protocols and parameters may vary between different networks. For example, one network may employ a different modulation scheme and operate at different frequencies than other networks.

The BSC 220 of the illustrated example includes a non-DRX transceiver 227 that sends and receives information about non-DRX mode operation at the mobile station 202. For example, in an example implementation, the non-DRX transceiver 227 sends an indication to the mobile station 202 to instruct the mobile station 202 to reduce the duration of a non-DRX mode timer period. In other implementations, the non-DRX transceiver 227 sends an indication to the mobile station 202 to indicate that the network supports optimized non-DRX mode operation by the mobile station 202.

The wireless link shown in communication system 200 of FIG. 2 represents one or more different channels, typically different radio frequency (RF) channels, and associated protocols used between the wireless network 204 and the mobile station 202. An RF channel is a limited resource that must be conserved, typically due to limits in overall bandwidth and a limited battery power of the mobile station 202. A wireless network may include hundreds of cells, each served by a station 218 (i.e. or station sector), depending upon desired overall expanse of network coverage. All pertinent components may be connected by multiple switches and routers (not shown), controlled by multiple network controllers.

For a plurality of mobile stations 202 registered with a network operator, permanent data (such as mobile station 202 user's profile) as well as temporary data (such as mobile station's 202 current location) are stored in the HLR 232. In case of a voice call to the mobile station 202, the HLR 232 is queried to determine the current location of mobile station 202. A Visitor Location Register (VLR) of the MSC 222 is responsible for a group of location areas and The SGSN 226 is at the same hierarchical level as the MSC 222 and keeps track of the individual locations of mobile stations. The SGSN 226 also performs security functions and access control. The SGSN 226 of the example wireless communication network 204 and the SGSN 226 of the example wireless communication network 205 are communicatively coupled to allow communication between wireless communication network 204 and wireless communication network 205 (e.g., for communication of ROUTING AREA UPDATE messages and ATTACH messages). The GGSN 228 provides interworking with external packet-switched networks and is connected with SGSNs (such as SGSN 226) via an IP-based GPRS backbone network. The SGSN 226 performs authentication and cipher setting procedures based on the same algorithms, keys, and criteria as in existing GSM.

In operation, the mobile station 202 makes its presence known to wireless network 204 by performing what is known as a GPRS "attach" operation. This operation establishes a logical link between the mobile station 202 and the SGSN 226 and makes the mobile station 202 available to receive, for example, pages via the SGSN 226, notifications of incoming GPRS data, or SMS messages over GPRS. In order to send and receive GPRS data, the mobile station 202 assists in activating the packet data address that it wants to use. This operation makes mobile station 202 known to the GGSN 228; interworking with external data networks can thereafter commence. User data may be transferred transparently between the mobile station 202 and the external data networks using, for example, encapsulation and tunneling. Data packets are equipped with GPRS-specific protocol information and transferred between the mobile station 202 and the GGSN 228.

A wireless network may be connected to other systems, possibly including other networks, not explicitly shown in FIG. 2. A network will normally be transmitting at least some sort of paging and system information on an ongoing basis, even if there is no actual packet data exchanged. Although the network consists of many parts, these parts all work together to result in certain behaviors at the wireless link.

Flowcharts of example processes that may be executed to implement some or all of the elements of the system 200 and mobile communication devices described herein are shown in FIGS. 3, 5, 7, 8, 10, and 14.

In these examples, the process represented by each flowchart may be implemented by one or more programs comprising machine readable instructions for execution by: (a) a processor, such as the microprocessor 2112 shown in the example computer 2100 discussed below in connection with FIG. 21, (b) a controller, such as the controller 206 of FIG. 2, and/or (c) any other suitable device. The one or more programs may be embodied in software stored on a tangible medium such as, for example, a flash memory, a CD-ROM, a floppy disk, a hard drive, a DVD, or a memory associated with the processor 2112, but the entire program or programs and/or portions thereof could alternatively be executed by a device other than the microprocessor 2112 and/or embodied in firmware or dedicated hardware (e.g., implemented by an application specific integrated circuit (ASIC), a programmable logic device (PLD), a field programmable logic device (FPLD), discrete logic, etc.). For example, any one, some or all of the example mobile communications system components could be implemented by any combination of software, hardware, and/or firmware. Also, some or all of the processes represented by the flowcharts of FIGS. 3, 5, 7, 8, 10, and 14 may be implemented manually.

Further, although the example processes are described with reference to the flowcharts illustrated in FIGS. 3, 5, 7, 8, 10, and 14, many other techniques for implementing the example methods and apparatus described herein may alternatively be used. For example, with reference to the flowcharts illustrated in FIGS. 3, 5, 7, 8, 10, and 14, the order of execution of the blocks may be changed, and/or some of the blocks described may be changed, eliminated, combined, and/or subdivided into multiple blocks. Any of the described blocks may be as implemented as part of an existing system. For example, blocks may be implemented as part of a mobility manager such as a mobility management entity of an LTE system or may be implemented as a part of a mobile station, etc. While the example block diagrams are described as implementing the processes of the flowcharts, the apparatus of the block diagrams may implement any process and, likewise, the processes of the flowcharts may be implemented by any apparatus, device, system, software, or combination thereof.

Determining, as used herein, may be any type of process for identifying a particular result and is not limited to a computational or analysis process. For example, determining may involve reading an indicator, flag, register, variable, identifier, etc. to determine whether a service is supported. In another example, determining may involve querying, extracting, computing, calculating, etc. to determine a result.

Figure 3:
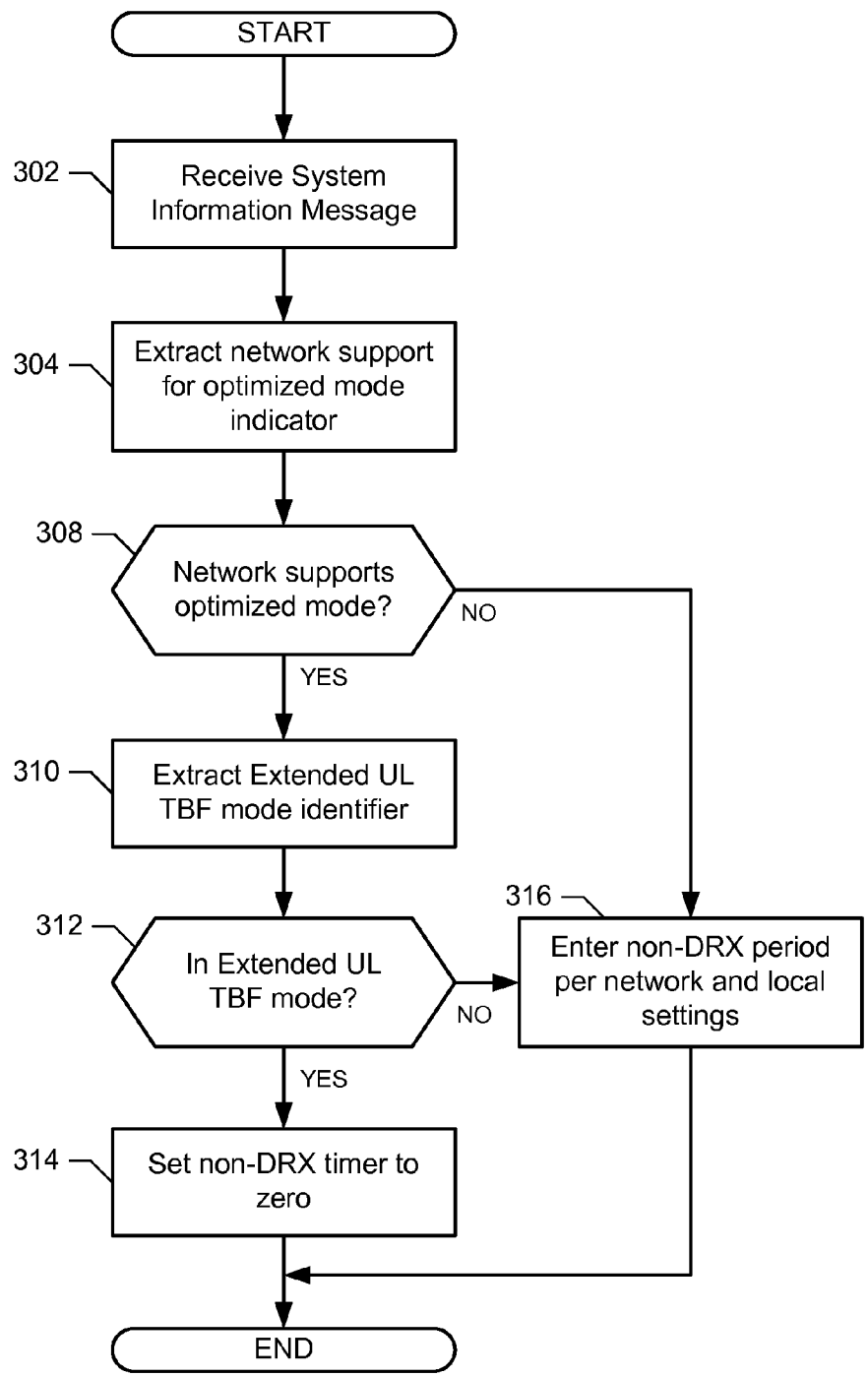
FIG. 3 is a flowchart of an example process to control the non-DRX timer period following the release of an uplink (UL) temporary block flow (TBF).

FIG. 3 is a flowchart of an example process to control the non-DRX timer period following the release of an uplink (UL) temporary block flow (TBF). The process of FIG. 3 begins when the mobile station 202 receives a system information message from the network 204 (block 302). The non-DRX control module 207 extracts an optimized mode support indication from the system information message (block 304). For example, the non-DRX transceiver 227 may insert an optimized mode support indication in a system information message sent by the base station controller 220 to inform the mobile station 202 that the network 204 supports optimized use of the non-DRX mode. The non-DRX control module 207 then determines if the optimized mode support indication indicates that the network 204 supports the optimized mode (e.g., the optimized mode support indication may be set to 1 to indicate support and 0 to indicate lack of support or the optimized mode support indication may be present when there is support and not present when there is no support) (block 306). When the network does not support the optimized mode, the mobile station enters the non-DRX period based on legacy implementations using the network provided non-DRX timer period and the mobile station setting for non-DRX timer period (e.g., see 3GPP TS 24.008, 43.013, and 44.060) (block 316) and the process of FIG. 3 ends. While the example process of FIG. 3 includes such a determination regarding network support, the mobile station 202 may alternatively operate under the assumption that the network supports the optimized mode and no indication may be provided by the network or analyzed by the mobile station.

When the network supports optimized mode (block 308), the non-DRX control module 207 extracts an extended uplink (UL) TBF mode identifier (e.g., NW_EXT_UTBF) that indicates whether the current uplink TBF is operating in extend uplink TBF mode (block 312). When the uplink is not in extended mode, the mobile station enters the non-DRX period based on legacy implementations using the network provided non-DRX timer period and the mobile station setting for non-DRX timer period (block 316).

When the uplink is operating in extended mode (block 312), the non-DRX control module 207 sets the non-DRX timer to zero (block 314). The process of FIG. 3 then ends.

Setting the non-DRX timer to zero at the mobile station 202 will cause the mobile station 202 to immediately enter the DRX period after the uplink TBF is released. Because the extended uplink mode keeps the uplink TBF active for a period of time following the transfer of queued data packets, the mobile station 202 can enter the DRX period immediately after TBF release to conserve power. In contrast to the non-extended uplink mode, the extended active period of the extended TBF reduces the likelihood that the mobile station 202 will immediately need to reestablish a TBF following the TBF release. While the illustrated example sets the non-DRX timer to zero (block 314), any operation to cause the mobile station 202 to move immediately or substantially immediately to the DRX mode may be used. While the mobile station 202 of the illustrated example does not signal its support of the optimized mode to the network 204, the mobile station 202 may alternatively send a communication to the network 204 to indicate such support.

Figure 4:
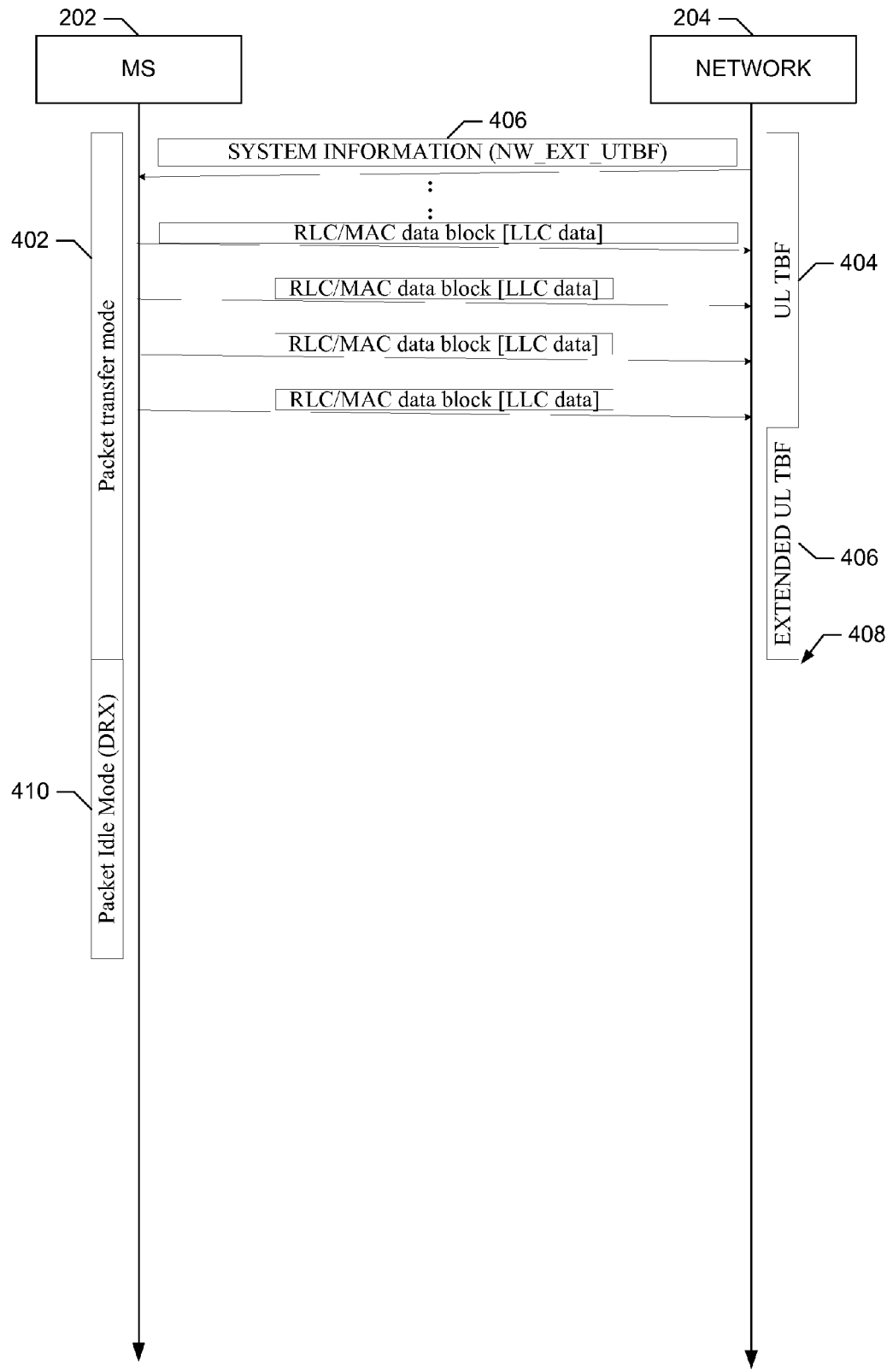
FIG. 4 is an example message flow that may occur in conjunction with the process of FIG. 3.

FIG. 4 is an example message flow that may occur in conjunction with the process of FIG. 3. According to the example message flow, the mobile station is in packet transfer mode 402 and the network 204 and an uplink TBF 404 is active at the network 204. At some time, the network 404 has sent a system information message 406 to the mobile station 402 including the NW_EXT_UTBF parameter indicating that the network 204 is operating in extended uplink mode. The system information message 406 may also indicate that the network supports optimized mode operation as described in conjunction with FIG. 3. The mobile station 402 transmits various RLC/MAC data blocks containing LLC data to the network 204. When there are no further data blocks to transmitted, the mobile station 402 and the network 404 keep the TBF active in extended uplink mode 406. During this period, if further data packets need to be sent by the mobile station 202, the TBF will not need to be reestablished. After the extended uplink mode expires, the TBF is released at 408. As described in FIG. 3, instead of entering a non-DRX period, the mobile station 202 proceeds to packet idle DRX mode 410.

Figure 5:
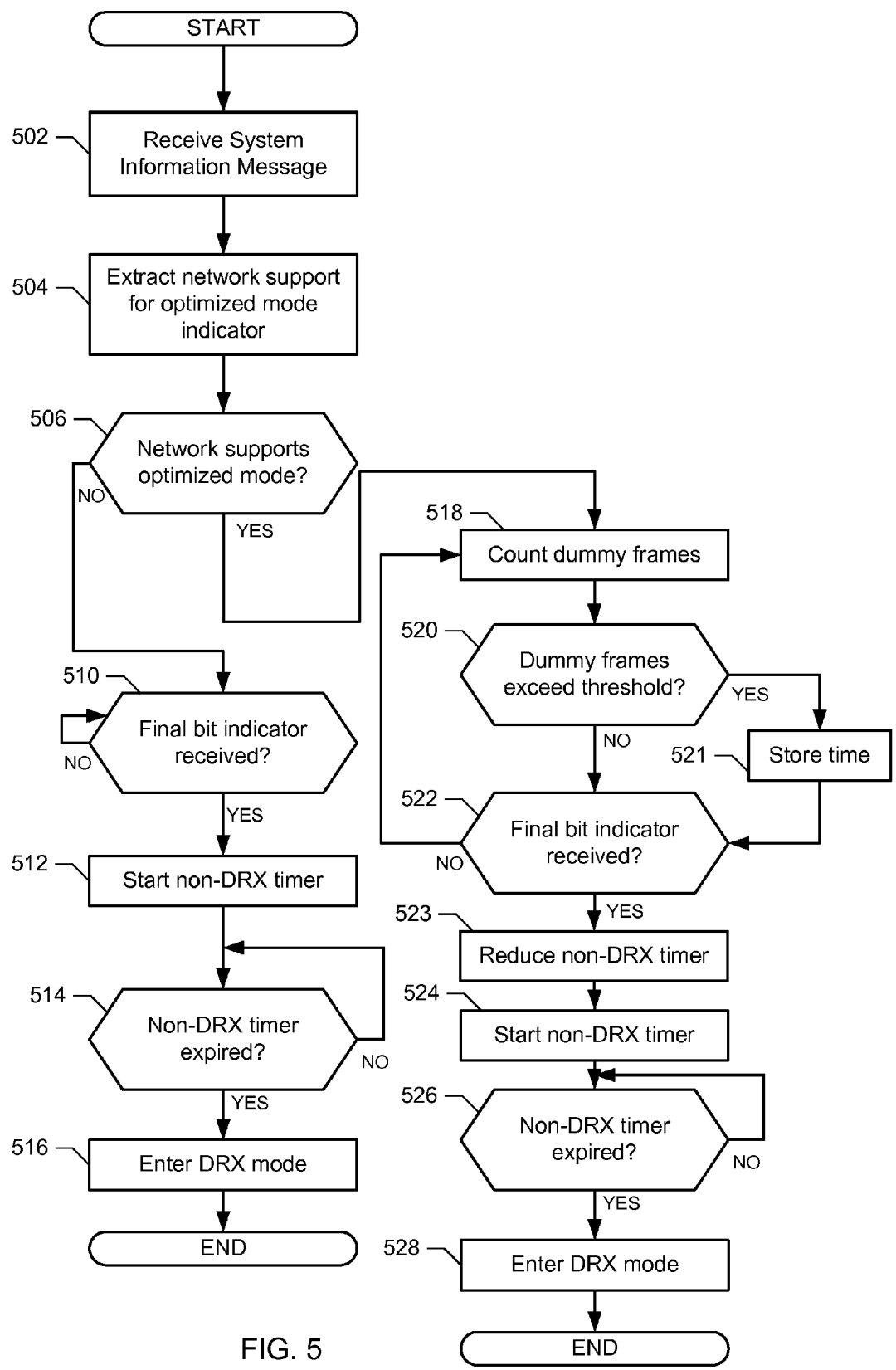
FIG. 5 is a flowchart of an example process to control the non-DRX timer period following the release of a downlink TBF.

FIG. 5 is a flowchart of an example process to control the non-DRX timer period following the release of a downlink TBF. The example process of FIG. 5 begins when the mobile station 202 receives a system information message from the network 204 (block 502). The non-DRX control module 207 of the mobile station 202 extracts an optimized mode support indication from the system information message (block 504). For example, the non-DRX transceiver 227 may insert an optimized mode support indication in a system information message sent by the base station controller 220 to inform the mobile station 202 that the network 204 supports optimized use of the non-DRX mode. The non-DRX control module 207 then determines if the optimized mode support indication indicates that the network 204 supports the optimized mode (e.g., the optimized mode support indication may be set to 1 to indicate support and 0 to indicate lack of support or the optimized mode support indication may be present when there is support and not present when there is no support) (block 506).

When the network does not support the optimized mode (block 506), the mobile station 202 continues to handle downlinked packets and awaits reception of a FBI with a value of 1 indicating that the TBF is to be released (block 510). When the FBI is received, the mobile station 202 starts the non-DRX timer (block 512). The mobile station 202 then wait for the expiration of the non-DRX timer (block 514). When the non-DRX timer expires, the mobile station 202 enters the packet idle DRX mode (block 516). The process of FIG. 5 then ends. The mobile station 202 continues to operate in packet idle mode until a new TBF session is to be established.

Returning to block 506, when the network supports the optimized mode (block 506), the non-DRX control module 207 of the mobile station 202 counts dummy frames that are received from the network 204 (block 518). Dummy frames are sent by the network 204 to keep the downlink TBF active while waiting for further data to be sent to the mobile station 202. The non-DRX control module 207 determines if the dummy frame count exceeds a threshold (block 520). For example, the threshold may be set at two dummy frames, two consecutive dummy frames, or any other threshold. The threshold may be a value received from a user of the mobile station 202, a value stored in the mobile station 202 by a manufacturer or service provider, a value communicated to the mobile station 202 by the network 204, etc. When the count of dummy frames exceeds a threshold, control proceeds to block 524, the time at which the dummy count threshold was reached is stored (block 521). Control then proceeds to block 522. According to the illustrated example, when a dummy count threshold was previously stored for the TBF session, the new time may not be stored and control may proceed to block 522. In another implementation, a dummy count timer may be started to track the amount of time that passes during receipt of dummy packets rather than storing the dummy threshold time.

When the count of dummy frames does not exceeds the threshold (block 520), the non-DRX control module 207 determines if a FBI with a value of 1 has been received (block 522). When an FBI with a value of 1 has not yet been received, control returns to block 518 to continue counting and waiting for the FBI.

When an FBI with a value of 1 has been received (block 522) indicating that the TBF is to be released, the non-DRX control module 207 reduces the non-DRX timer period by the amount of time that the TBF was sending dummy packets (block 523). For example, the stored dummy packet time may be subtracted from the current time to determine the duration and the non-DRX timer period may be reduced by the amount of the difference. Alternatively, when a dummy packet timer is used, the time on the dummy packet timer when the FBI is received may be subtracted from the non-DRX timer period. According to the illustrated example, when the amount of the reduction in the non-DRX timer period exceeds the original non-DRX timer period, the non-DRX timer period is set to zero or the mobile station 202 otherwise moves directly to packet idle DRX mode.

After adjusting the non-DRX timer period as necessary (block 523), the non-DRX control module 207 causes the non-DRX timer to be started (block 524). Because the non-DRX timer may have been reduced by any applicable reduction due to receipt of dummy packets during a delayed downlink TBF, the non-DRX timer will expire earlier than if the non-DRX control module 207 had not adjusted the non-DRX timer period. Thus, the mobile station 202 will spend less time in the more power consuming non-DRX packet idle mode following the TBF release. Because the network 204 is sending dummy packets, the non-DRX control module 207 can recognize that the downlink is in delayed DL TBF operation. Further, there is a lower likelihood that further data will need to be downlinked after the TBF release, because the network 204 has already transmitted all data and is now sending dummy packets.

After starting the non-DRX timer (block 524), the non-DRX control module 207 awaits the expiration of the timer (block 526). When the timer has expired, the mobile station 202 enters the packet idle DRX mode (block 528).

Figure 6:
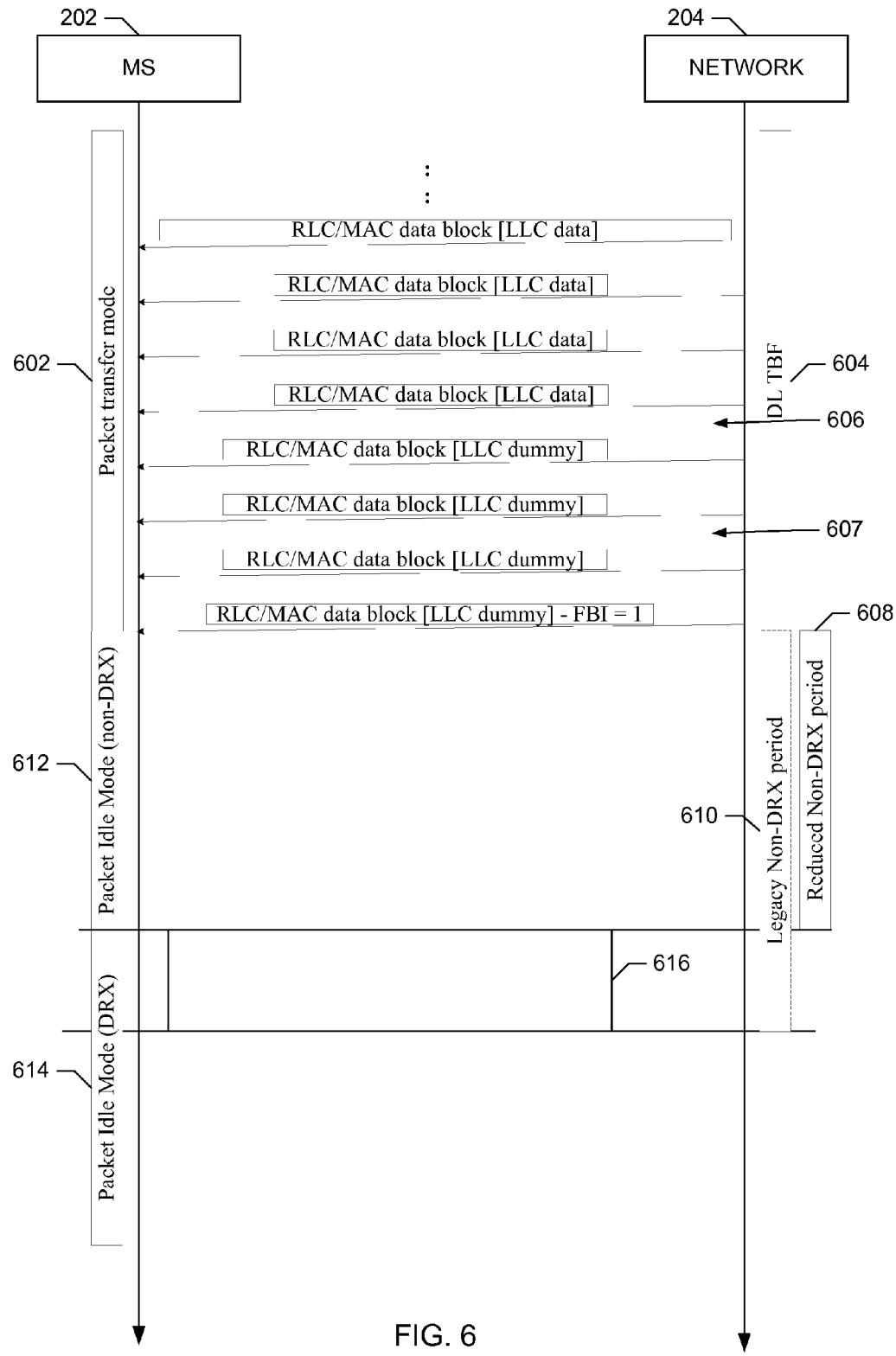
FIG. 6 illustrates an example message flow that may occur in conjunction with the process of FIG. 5.

FIG. 6 illustrates an example message flow that may occur in conjunction with the process of FIG. 5. The example message flow begins with the mobile station 202 in packet transfer mode 602 and the network in a downlink TBF session 604. During this time, the network 204 is sending RLC/MAC data blocks containing LLC data to the mobile station 202. At time 606, the network 204 has completed sending all queued data and, because the network is operating in delayed DL TBF mode, the network begins sending RLC/MAC data blocks that contain dummy data to keep the TBF active.

According to the illustrated example, the non-DRX control module 207 has been set to have a dummy packet threshold of two. Accordingly, after two dummy packets have been received by the mobile station 202 and counted by the non-DRX control module 207, the non-DRX control module 207 causes the time 607 to be stored so that the non-DRX timer period can be reduced by amount of time that dummy packets are received (e.g., the time from 606 to the packet with the FBI value of 1. Accordingly, when the network 204 sends the FBI with a value of 1 to release the TBF, the non-DRX timer period is reduced as shown in block 608. The legacy non-DRX period 610 illustrates where the non-DRX timer would have begun and how the non-DRX period would have lasted longer had the non-DRX timer not been started earlier. Once the non-DRX timer expires, the mobile station 202 enters the packet idle DRX mode. Accordingly, the mobile station 202 will operate for a shorter period of time in non-DRX mode than in legacy systems as shown by the duration labeled by box 616.

Figure 7:
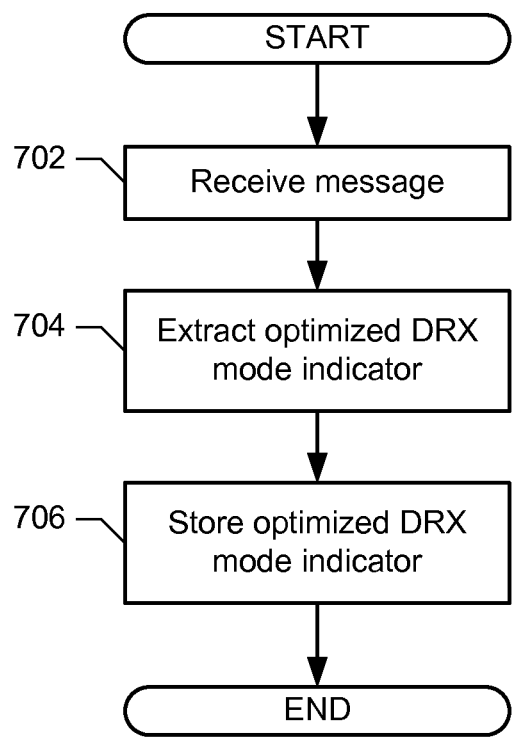
FIGS. 7 and 8 are flowcharts of example processes to enable the network 204 to command the non-DRX operation of the mobile station 202.
Figure 8:
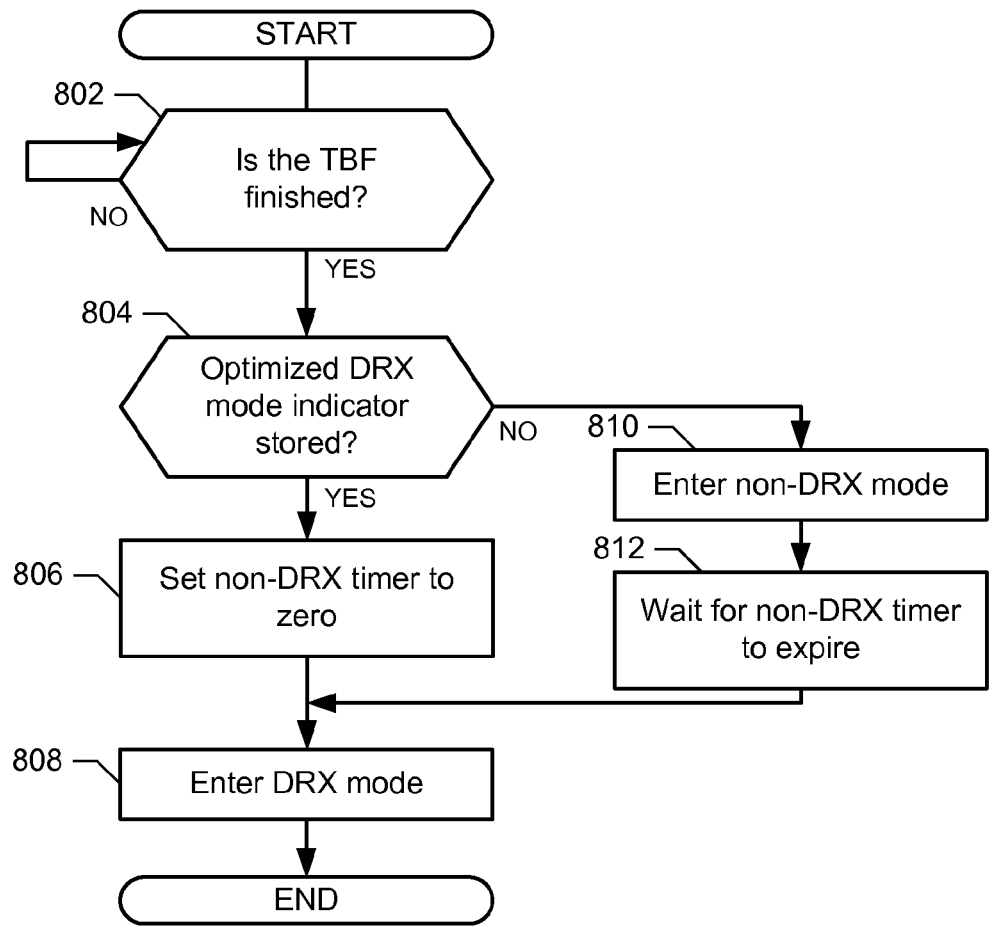

FIGS. 7 and 8 are flowcharts of example processes to enable the network 204 to command the non-DRX operation of the mobile station 202.

The process of FIG. 7 begins when the mobile station 202 receives a network message from the network 204 (block 702). For example, the network message may be any one or more of a packet downlink assignment, a packet uplink assignment, a packet timeslot reconfigure, a packet CS release indication, a packet switched (PS) handover command, a dual transfer mode (DTM) assignment command, a packet assignment, a multiple TBF downlink assignment, etc. According to the illustrated example, the non-DRX transceiver 227 has included an optimized DRX mode indicator in the message. For example, the non-DRX transceiver 227 may have inserted an OPTIMIZED_DRX_MODE identifier in the message as shown in the appendix. The non-DRX transceiver 227 may insert the bit or set the bit to enabled to indicate that the network 204 requests that the mobile station 202 use optimized DRX mode operation.

The non-DRX control module 207 then extracts the optimized DRX mode indicator (e.g., the OPTIMIZED_DRX_MODE bit) from the received message (block 704). The non-DRX control module 207 then stores the optimized DRX mode indicator (block 706). For example, the non-DRX control module 207 may store the optimized DRX mode indicator in the memory 243 at the mobile station 202. In storing the optimized DRX mode indicator, a previously stored optimized DRX mode indicator may be overwritten so that only the most recently received DRX mode indicator is stored.

The process of FIG. 8 is performed following a downlink or uplink TBF session to control the operation of the non-DRX mode at the mobile station 202. The process of FIG. 8 begins when the non-DRX control module 207 determines that the active TBF is finished (block 802). When the active TBF is finished, the non-DRX control module 207 continues to wait. The completion of the TBF may be determined from the reception of a FBI value of 1 (e.g., when the TBF is a downlink TBF) or may be determined from the expiration of a countdown timer that is started at the mobile station 202 once the number of queued RLC blocks reaches a threshold.

When the TBF is finished (block 802), the non-DRX control module 207 determines if an optimized DRX mode indicator has previously been stored at the mobile station 202 (block 804). For example, an optimized DRX mode indicator may have been stored in the memory 243 by the process of FIG. 7. When an optimized DRX mode indicator has not been stored, the mobile station 202 enters the non-DRX mode (block 810) and waits for the non-DRX timer to expire (block 812). Control then proceeds to block 808, which is described below.

When the optimized DRX mode indicator is stored (e.g., indicating that the network 204 has instructed the mobile station 202 to use optimized DRX mode (block 804), the non-DRX control module 207 sets the non-DRX timer at the mobile station 202 to zero (block 806). Setting the non-DRX timer to zero will cause the timer to immediately expire and immediately move to the DRX mode. Of course, any other operation that causes the mobile station 202 to immediately or substantially immediately move to the DRX mode may be used.

After the non-DRX timer is set to zero (block 806) or the non-DRX timer expires (block 812), the mobile station 202 moves to the packet idle DRX mode (block 808).

Figure 9:
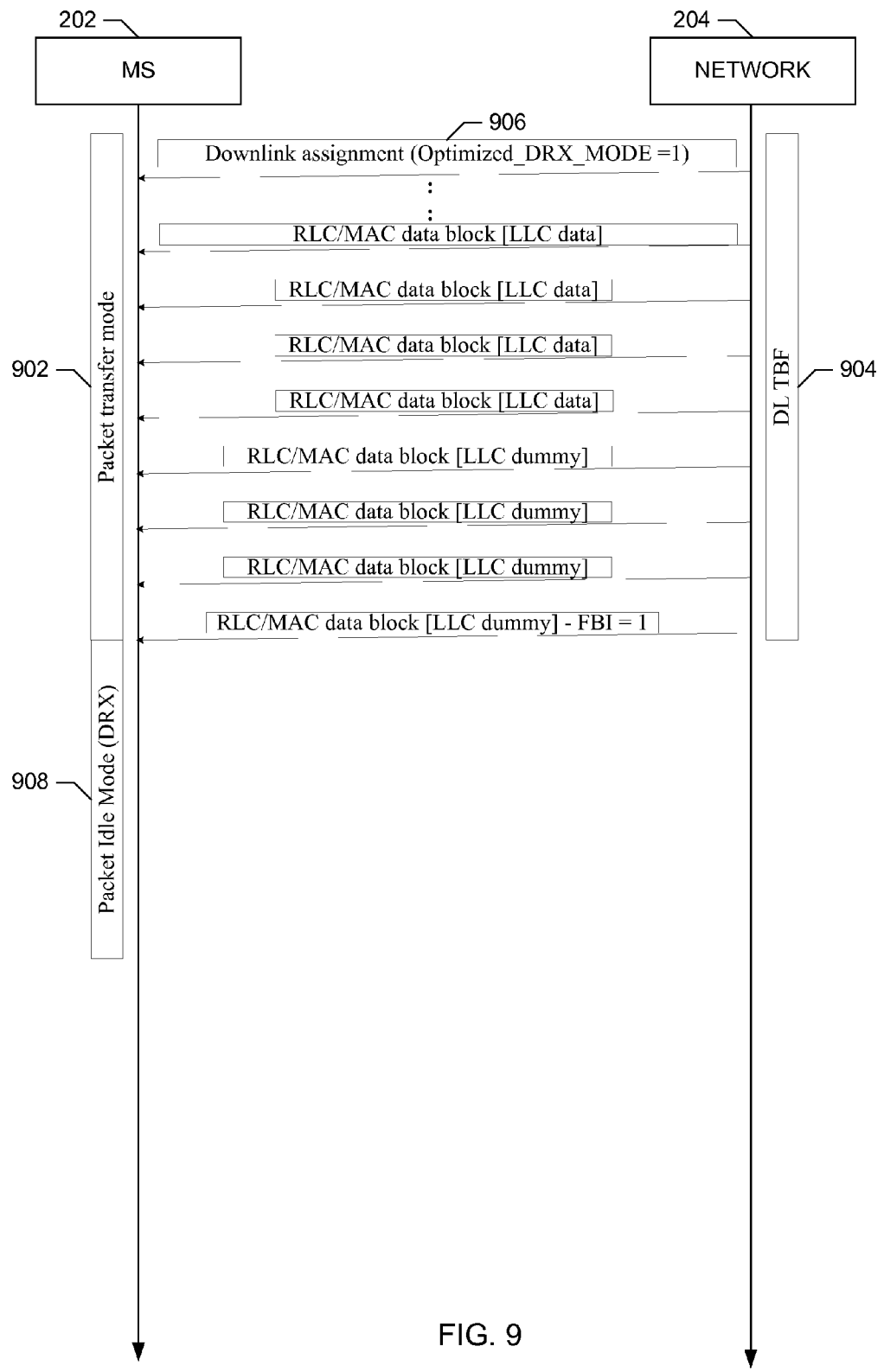
FIG. 9 illustrates an example message flow that may occur in conjunction with the process of FIGS. 7 and 8.

FIG. 9 illustrates an example message flow that may occur in conjunction with the process of FIGS. 7 and 8. The example message flow of FIG. 9 begins with the mobile station 202 in packet transfer mode 902 and the network having a downlink TBF session 904 active. At some time during operation the network 204 sends a downlink assignment message 906 to the mobile station 202. The downlink assignment message 906 includes an OPTIMIZED_DRX_MODE bit set to 1 to indicate that the network 204 is instructing the mobile station 202 to use optimized DRX operation. Of course, any other type of message or indication could be used as described above.

The network 204 sends various RLC/MAC data blocks that include LLC data and LLC dummy packets to the mobile station 202. Eventually, the network 204 determines to release the TBF and sends an RLC/MAC data block including an FBI with a value of 1 to the mobile station 202. The DL TBF 904 is then released. Because the mobile station 202 has previously received the OPTIMIZED_DRX_MODE bit set to 1, then non-DRX control module 207 causes the mobile station to move to the packet idle DRX mode 908 without waiting in a non-DRX mode.

Figure 10:
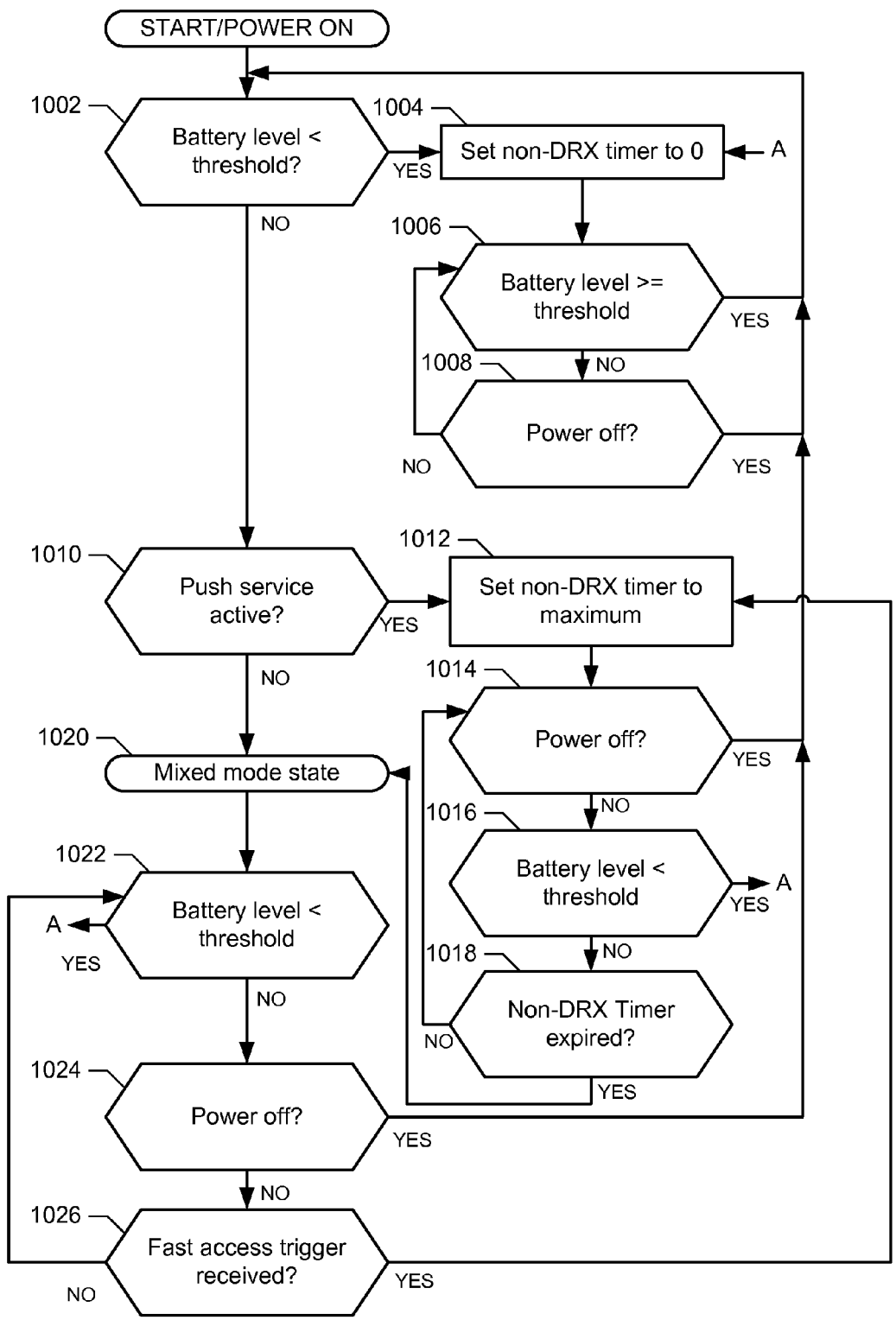
FIG. 10 is a flowchart of an example process to a dynamically control the non-DRX mode operation at mobile station.

FIG. 10 is a flowchart of an example process to a dynamically control the non-DRX mode operation at mobile station 202. For example, the operation may be performed when a TBF for uplink communication, downlink communication, or both is released or any other time at which the processing of non-DRX mode should be determined. The process of FIG. 10 begins at power-on of the mobile station 202 when the non-DRX control module 207 of the mobile station 202 determines if the charge level of the battery 232 of the mobile station 202 is below a threshold (block 1002). When the charge level is below a threshold (e.g., indicating that the battery 232 is low), the non-DRX control module 207 sets the non-DRX timer for the mobile station 202 to zero to cause the mobile station 202 to not use non-DRX mode and to move to DRX mode after a TBF is released (block 1004).

The non-DRX control module 207 then makes a determination as to whether the charge level of the battery 232 is greater than or equal to the threshold (or a second threshold, such as a threshold greater than the threshold in block 1002 to prevent the non-DRX control module from quickly moving between states when the battery 232 is close to the threshold level) (block 1006). When the battery 232 is greater than or equal to the threshold (e.g., after a power source has been applied to charge the battery 232), control returns to block 1002. When the charge level of the battery 232 is not greater than or equal to the threshold, the non-DRX control module 207 determines if the user has requested to power off the mobile station 202 (block 1008). When the user has requested to power off the mobile station, control returns to block 1002. When the user has not requested to power off the mobile station, control returns to block 1006 to continue waiting for an increase in the charge level of the battery 232 or a user request to power off the mobile station 202.

Returning to block 1002, when the charge level of the battery 232 is greater than or equal to the threshold (block 1002), the non-DRX control module 207 determines if push service (or any other service that requires real-time or fast data access) is activated at the mobile station 202 (block 1010).

When push service is active at the mobile station (block 1010), the non-DRX control module 207 sets the non-DRX timer to the maximum non-DRX timer value agreed to by the network (block 1012). For example, the network 204 may transmit a maximum value for the non-DRX timer to the mobile station 202 in a system information message as previously described. The non-DRX control module 207 then determines if a user of the mobile station 202 has requested to power off the mobile station 202 (block 1014). When a user has requested power off, control returns to block 1002. When a user has not requested power off, the non-DRX control module 207, determines if the charge level of the battery 232 is less than a threshold (block 1016). When the charge level of the battery 232 is less than a threshold, control returns to block 1004. When the charge level of the battery 232 is not less than a threshold, the non-DRX control module 207 determines if the non-DRX timer has expired (block 1018). When the non-DRX timer has not expired, control returns to block 1014. When the non-DRX timer has expired, control proceeds to block 1020.

After the non-DRX timer has expired in block 1018 or the non-DRX control module 207 has determined that push service is not activated at the mobile station 202 (block 1010), the non-DRX control module moves to the mixed mode state (block 1020). The mixed mode state analyzes a variety of operational parameters and characteristics of the mobile station 202 to control the non-DRX mode. The mixed mode state 1020 is described in further detail in conjunction with FIG. 12.

After setting the non-DRX timer in the mixed mode state 1020, the non-DRX control module 202 determines if the charge level of the battery 232 is less than a threshold (block 1022). When the charge level of the battery is less than a threshold, control returns to block 1004. When the charge level of the battery is not less than the threshold, the non-DRX control module 207 determines if a user of the mobile station 202 has requested that the mobile station 202 be powered off (block 1024). When the mobile station 202 is to be powered off, control returns to block 1002. When the mobile station 202 is not to be powered off, the non-DRX control module 207 determines if a fast access trigger has been received or recognized (block 1026). For example, the non-DRX control module 207 may determine that an application requiring fast data access (e.g., a push data service) has been activated. When a fast access trigger has been received, control proceeds to block 1012. When a fast access trigger has not been received, control returns to block 1022.

Figure 11:
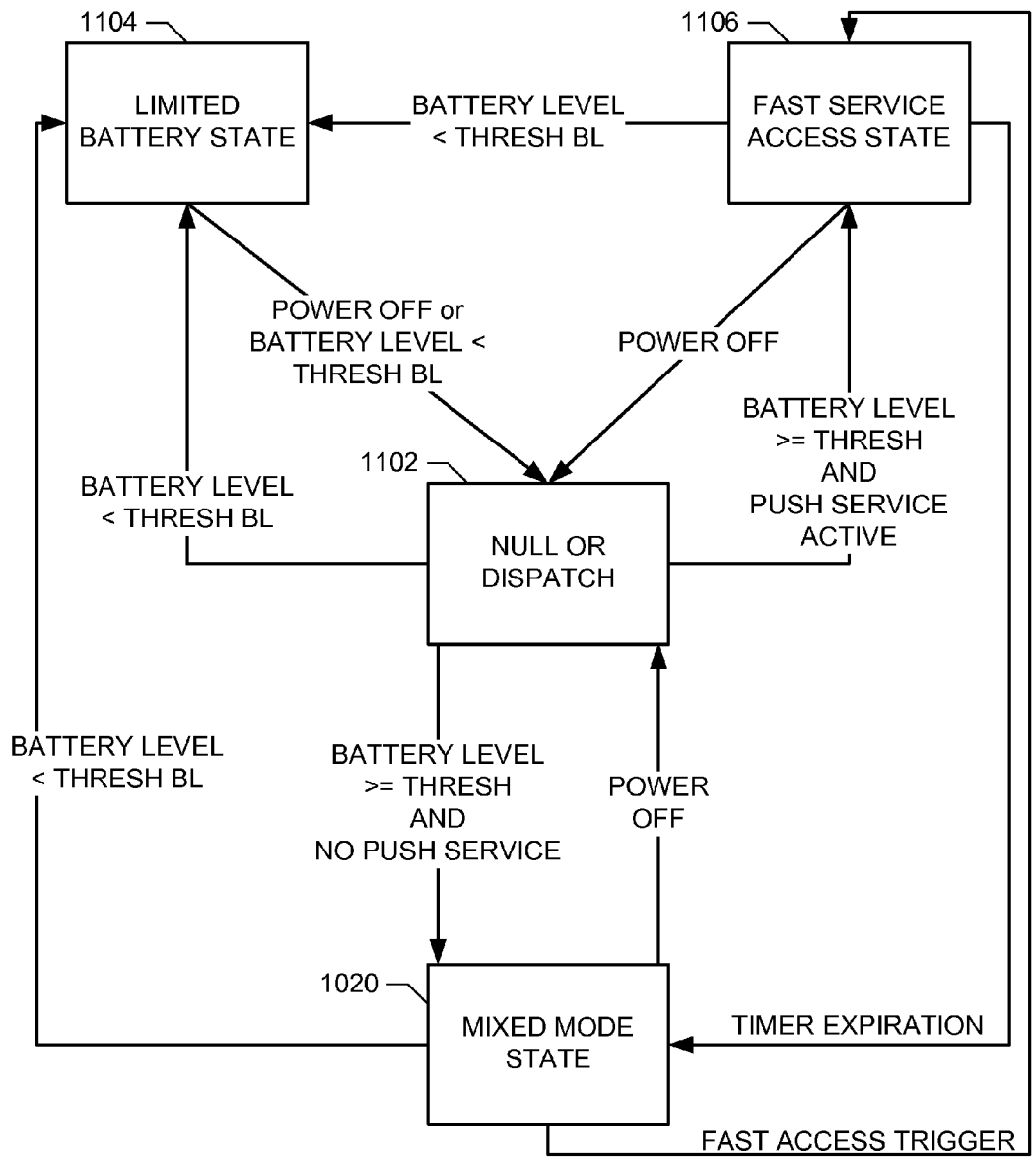
FIG. 11 is a state diagram illustrating how the non-DRX control module may operate to control the non-DRX mode of the mobile station.

FIG. 11 is state diagram illustrating how the non-DRX control module 207 may operate to control the non-DRX mode of the mobile station 202. The example state diagram includes four states: null or dispatch 1102, limited battery state 1104, fast access service 1106, and mixed mode state 1020.

The non-DRX control module 207 and the mobile station 202 start in the null or dispatch mode 1102. In the illustrated example, this is a transitory state in which no changes are made to the non-DRX mode operation. When the battery level of the mobile station 202 is below a threshold, the non-DRX control module 207 moves to the limited battery state 207. When the battery level is greater than or equal to the threshold and no push service (or other service requiring fast data access) is activated, the non-DRX control module 207 moves to the mixed mode state 1020. When the battery level is greater than or equal to the threshold and push service is activated, the non-DRX control module moves to the fast service access state.

In the limited battery state 1104, the non-DRX control module 207 sets the non-DRX timer to 0 to prevent the mobile station 202 from entering the non-DRX state, thereby conserving battery life. When the battery level becomes greater than or equal to the threshold or the mobile station 202 is powered off the non-DRX control module 207 returns to the null or dispatch mode 1102.

In the fast service access state 1106, the non-DRX control module 207 sets the non-DRX timer to the maximum value specified by the network 204. Setting the non-DRX timer to the maximum value will keep the mobile station 202 in non-DRX mode allowing the mobile station 202 to more quickly respond data transmissions and reducing the amount of signaling required when a data access is required. According to the illustrated example, the fast service access state is used when an application or service requires quick or frequent data use (e.g., the push data service). When the battery of the mobile station 202 drops below a threshold, the non-DRX control module 207 moves to the limited battery state 1104. When the mobile station 202 is powered off, the non-DRX control module 207 moves to the null or dispatch state 1102. When a fast service access timer expires, the non-DRX control module 207 moves to the mixed mode state 1020. The fast server access timer may be used as a countdown that allows the mobile station 202 to remain in fast service access for a period of time. For example, when the mobile station 202 has been in a non-transmission mode (e.g., Airplane mode) and is then changed to a transmission mode (e.g., moved out of Airplane mode), the mobile station 202 may enter the fast server access state 1106 for a period of time to allow the mobile station 202 to catch-up on data that may be waiting for transmission (e.g., emails for the mobile station 202 that the network 204 received while the mobile station 202 was in Airplane mode). The fast server access timer duration may be a user defined value, a value defined by the network 204, a value defined for the mobile station 202, a value defined by or for a particular application, etc.

Figure 12:
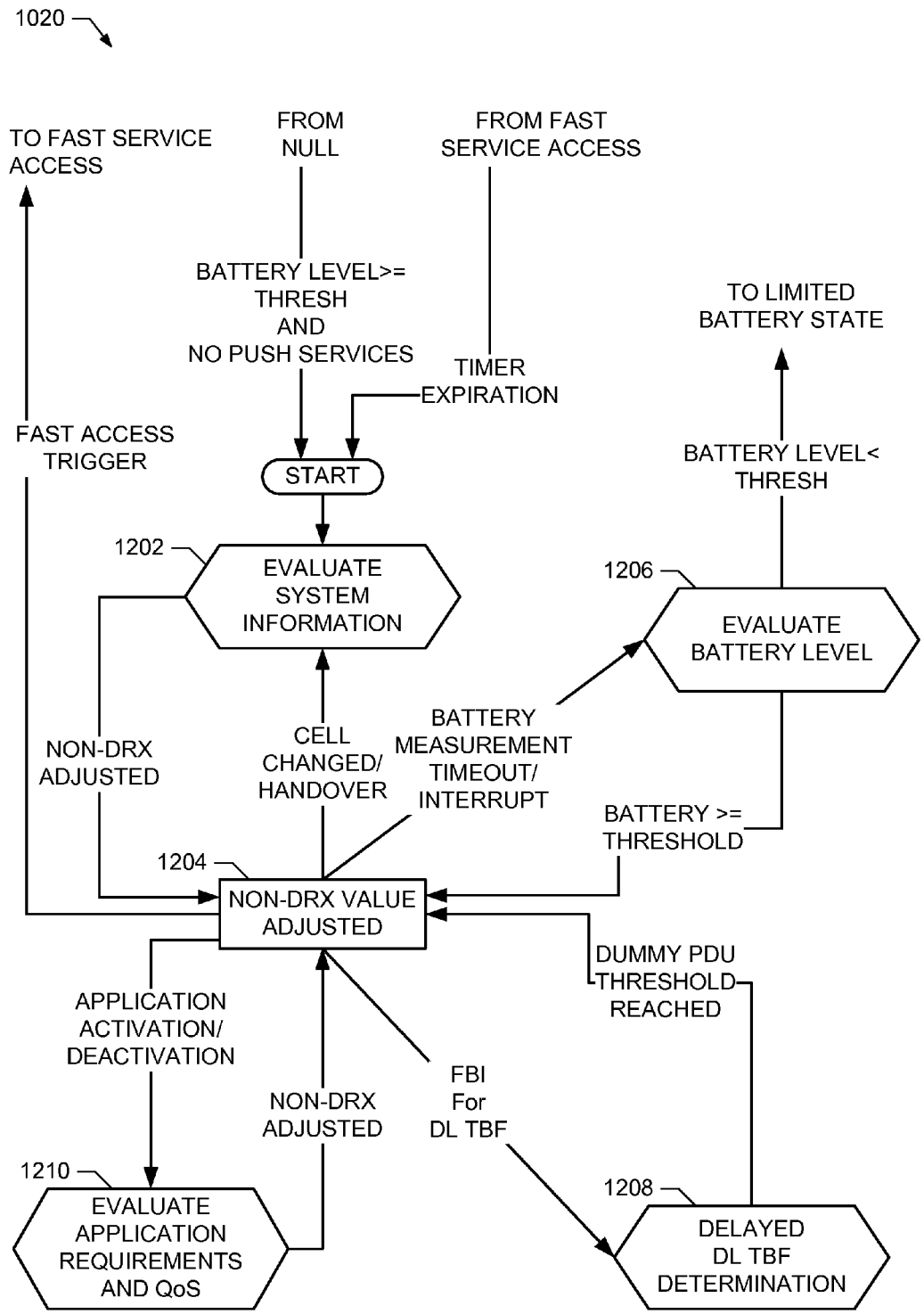
FIG. 12 is a state diagram of an example operation of the mixed mode state that may implement the mixed mode state of FIGS. 10 and 11.

The operation of the mixed mode state 1020 that attempts to balance battery usage and application demands is described in conjunction with FIG. 12. When a fast access trigger is received or recognized, the non-DRX control module 207 moves to the fast service access state 1106. When the battery level drops below a threshold, the non-DRX control module 207 moves to the limited battery state 1104. When the mobile station 202 is powered off, the non-DRX control module 207 moves to the null or dispatch state 1102.

While the foregoing provides example states and events that cause transitions between states, any system that uses states and characteristics of the mobile station 202, network 204, or other parameters to move between states may be used FIG. 12 is a state diagram of an example operation of the mixed mode state 1020 that may implement the mixed mode state 1020 of FIGS. 10 and 11. In particular, a process or instructions to implement the state diagram of FIG. 12 may be implemented.

As previously described, the non-DRX control module 207 of the mobile station 202 of FIG. 2 may move to the mixed mode state after determining that a battery level is greater than or equal to a threshold and push service is activated or after determining that a non-DRX timer has expired in the fast service access state 1106 of FIG. 11. The non-DRX control module 207 begins the mixed mode state 1020 by evaluating system information provided to the mobile station 202 in messages such as system information messages (block 1202). For example, the non-DRX control module 207 may analyze the NW_EXT_UTBF parameter, a DRX_TIMER_MAX parameter, or any other parameter indicative of the data operation mode or DRX setting of the mobile station 202. Based on the parameters, the non-DRX control module 207 explicitly adjusts the non-DRX timer setting at the mobile station 202 by sending a routing area update (RAU) message to the network indicating the new non-DRX timer settings. For example, the non-DRX timer may be set to the minimum of a timer value received from the network (e.g., MAX_DRX_TIMER) and a value proposed by the mobile station 202 (e.g., the NON-DRX_TIMER value). Additionally or alternatively, when the network indicates support for extended uplink TBF mode, the mobile station 202 may set the non-DRX timer to 0. The non-DRX control module 207 then moves to the non-DRX value adjusted state 1204.

From the non-DRX value adjusted state 1204, the non-DRX control module 207 may move to other states based on events. For example, when a fast access trigger is received or recognized, the non-DRX control module 207 may move to the fast service access state 1106 of FIG. 11. When a cell change or handover is detected by the non-DRX control module 207, the non-DRX control module 207 returns to the evaluation state 1202. When a battery measurement timeout or interrupt is detected by the non-DRX control module 207, the non-DRX control module 207 moves to the battery level evaluation state 1206. When a FBI with a value of 1 is received for a downlink TBF indicating that the TBF is to be released, the non-DRX control module moves to the extended downlink TBF determination state 1208. When an application activation or deactivation is received or recognized, the non-DRX control module 207 moves to the application evaluation state 1210.

In the battery level evaluation state 1206, the charge level of the battery 232 of the mobile station 202 is measured. When the battery level is less than a threshold level, the non-DRX control module moves to the limited battery level state 1104 of FIG. 11. Otherwise, if the battery level is greater than or equal to the threshold level, the non-DRX timer value remains the same and control returns to the non-DRX value adjusted state 1204.

In the delayed downlink TBF determination state 1208, the mobile station 202 and the network 204 communicate until the dummy packet count threshold is reached as described in conjunction with FIG. 5. When the dummy packet count threshold is reached, the non-DRX timer is started (so that the non-DRX timer period following the TBF release is shortened). The non-DRX control module 207 then moves to the non-DRX value adjusted state 1204.

In the application evaluation state 1210, the requirements of applications and quality of service (QoS) settings are evaluated. When application requirements or QoS settings request rapid access to data or utilize frequent data connections, the non-DRX value can be increased approaching the maximum value specified by the network. When application requirements and QoS settings are low, the non-DRX value can be decreased to reduce power consumption. The non-DRX control module 207 then moves to the non-DRX value adjusted state 1204.

Figure 13:
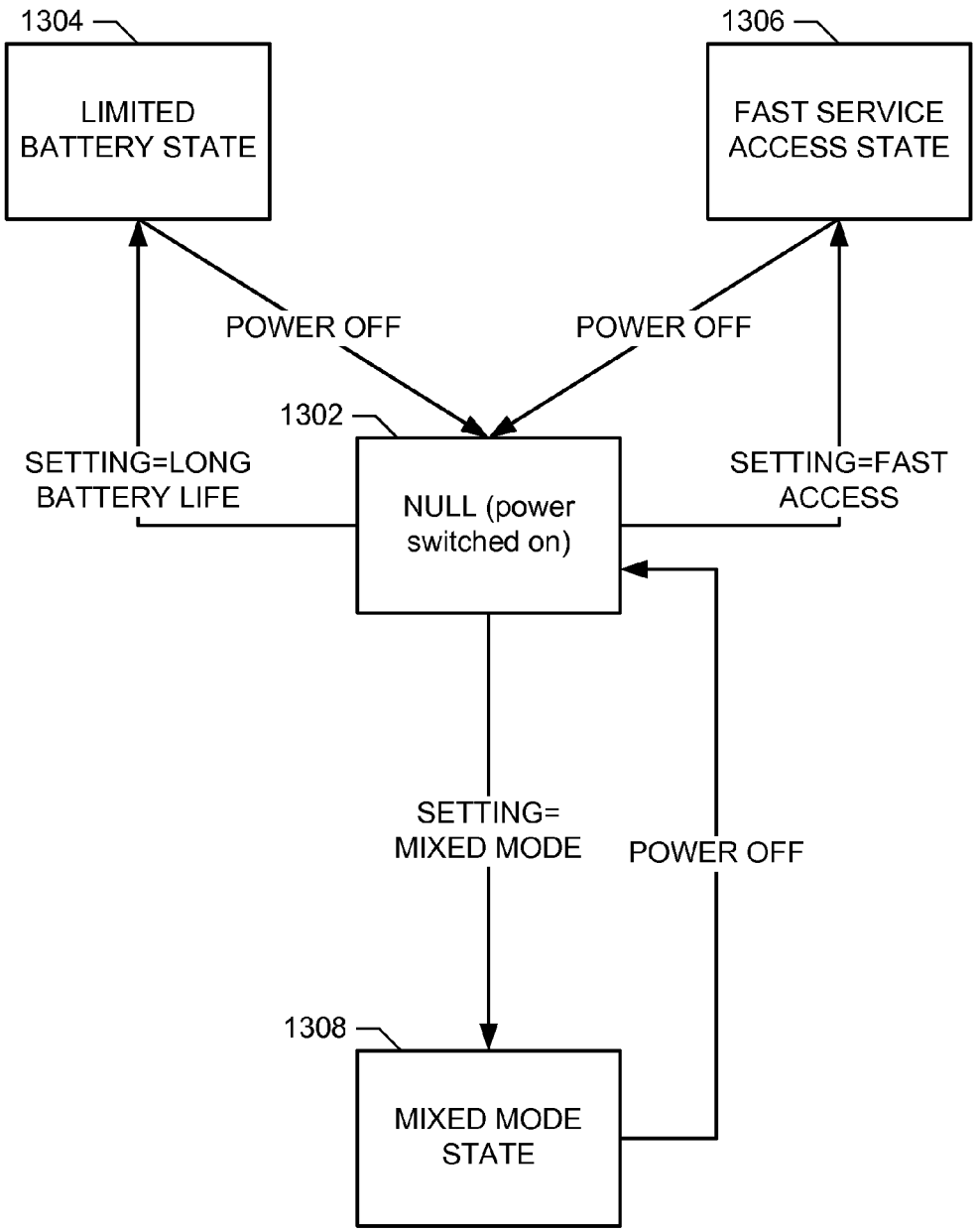
FIG. 13 is a state diagram of how the non-DRX control module may operate based on user input.

FIG. 13 is a state diagram of how the non-DRX control module 207 may operate based on user input. In the example state diagram, the user can provide a DRX mode setting to indicate a preference on operation that will control how the non-DRX control module moves from the initial null state 1302. According to the illustrated example, the DRX mode can be set by the user to: Long battery life, Fast Access, or Mixed Mode operation. When the user specifies long battery life, the non-DRX control module 207 moves to the limited battery state 1304. When the fast access setting is selected, the non-DRX control module 207 moves to the fast service access state 1306. When the mixed mode setting is selected, the non-DRX control module 207 moves to the mixed mode state 1308.

In the limited battery state 1304, the non-DRX control module 207 may operate as described in conjunction with the limited battery state 1104 of FIG. 11. When the user requests to power down the mobile station 202, the non-DRX control module 207 will move to the null state 1302.

In the fast service access state 1306, the non-DRX control module 207 may operate as described in conjunction with the fast service access state 1106 of FIG. 11. When the user requests to power down the mobile station 202, the non-DRX control module 207 will move to the null state 1302.

In the mixed mode state 1308, the non-DRX control module 207 may operate as described in conjunction with the mixed mode state 1108 of FIG. 11. When the user requests to power down the mobile station 202, the non-DRX control module 207 will move to the null state 1302.

Figure 14:
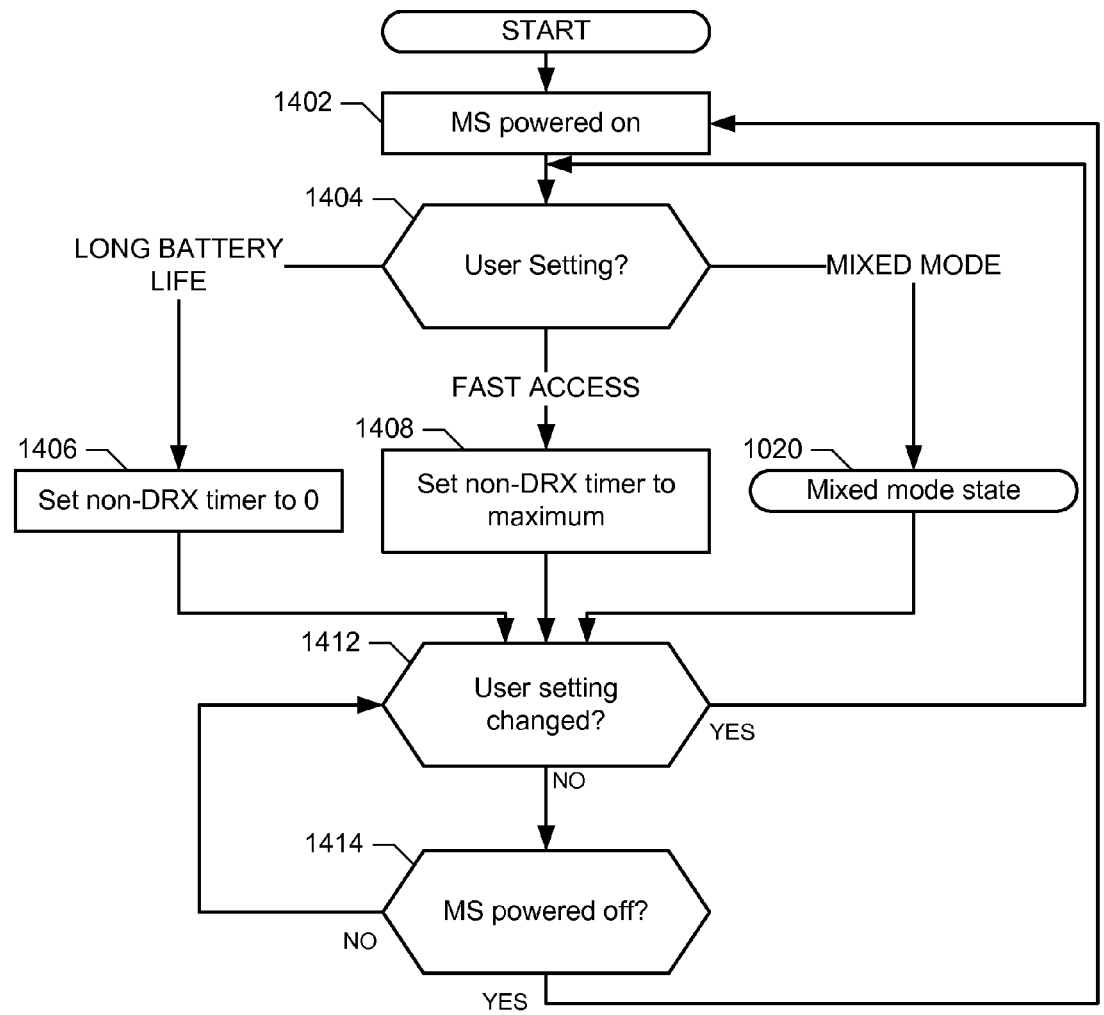
FIG. 14 is a flowchart of an example process to control the non-DRX mode operation of the mobile station based on user input.

FIG. 14 is a flowchart of an example process to control the non-DRX mode operation of the mobile station based on user input. The process of FIG. 14 begins when the mobile station 202 is powered on (1402). The non-DRX control module 207 retrieves the user setting (block 1404). For example, the user setting may be retrieved from a variable, bit, register, or other memory location (e.g., from the memory 243). Alternatively, the user setting could be retrieved from a physical switch, a push button, or other selector. In another alternative, the user setting could be identified by querying the user.

When the user setting indicates that long battery life is desired (block 1404), the non-DRX control module 207 sets the non-DRX timer period to zero to cause the mobile station 202 to transition to the packet idle DRX mode following a TBF release (block 1406). Any process to cause the mobile station 202 to move to DRX mode without remaining in non-DRX mode may be used. Control then moves to block 1412.

When the user setting indicates that fast access is desired (block 1404), the non-DRX control module 207 sets the non-DRX timer to its maximum value (block 1408). Any process to cause the mobile station 202 to remain in non-DRX mode following a TBF release may be used. For example, the non-DRX timer may be set to a maximum value specified by the network 204. Control then moves to block 1412.

When the user setting indicates that mixed mode operation is desired control moves to the mixed mode state 1020. The mixed mode state 1020 may be implemented as described in conjunction with FIG. 12. Alternatively, any process to optimize the non-DRX operation may be used. For example, a process may analyze the user settings, battery life, and application requirements to determine a setting for the non-DRX timer that balances power consumption with data access speed and availability. Control them moves to block 1412.

After the non-DRX control module 207 has controlled operation of non-DRX operation mode, the non-DRX control module 207 determines if the user setting has been changed (block 1412). When the user setting has been changed, control returns to block 1404 to control operation based on the new user setting.

When the user setting has not been changed (block 1412), the non-DRX control module 207 determines if the mobile station 202 has been powered off (block 1414). When the mobile station has not been powered off, control returns to block 1412 to continue waiting for a user setting change or powering off of the mobile station 202. When the mobile station 202 is powered off, control returns to block 1402 to wait for the mobile station 202 to be powered on. Additionally, the process of FIG. 14 could be implemented in conjunction with the process of FIG. 9 and/or the state diagrams of FIGS. 11 and 12.

Figure 15:
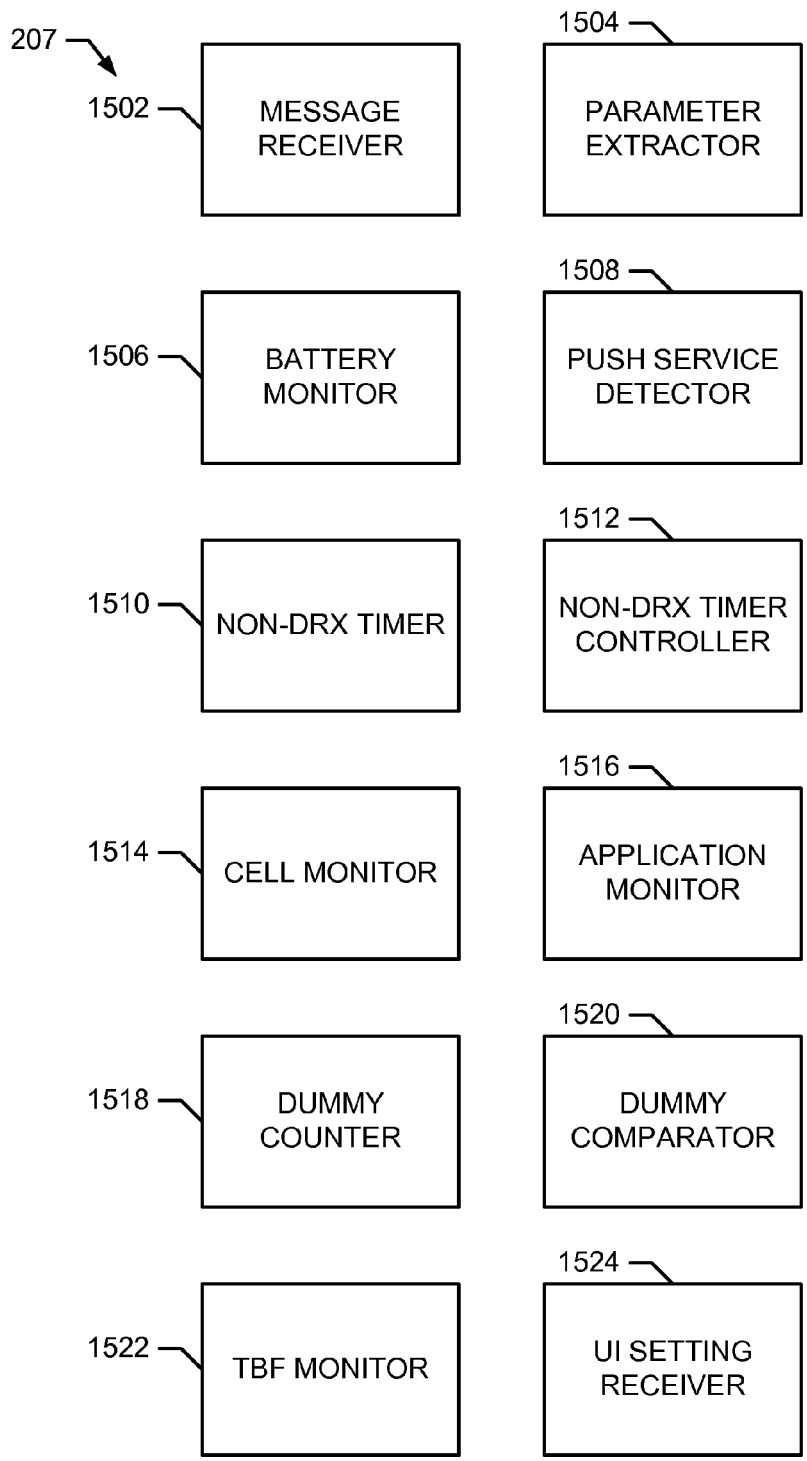
FIG. 15 is a block diagram of an example implementation of the non-DRX control module of FIG. 2.

FIG. 15 is a block diagram of an example implementation of the non-DRX control module 207 of the mobile station 202 of FIG. 2. The block diagram of FIG. 15 may implement one or more of the processes of FIGS. 3, 5, 7, 8, 10, and 14 and/or may be implemented by the execution of one or more of the processes of FIGS. 3, 5, 7, 8, 10, and 14. The example implementation of the control module 207 includes several elements, however, any subset of the elements may be used and one or more additional elements may be included in an implementation.

The example non-DRX control module 207 includes a message receiver 1502, a parameter receive 1504, a battery monitor 1506, a push service detector 1508, a non-DRX timer 1510, a non-DRX timer controller 1512, a cell monitor 1514, an application monitor 1516, a dummy counter 1518, a dummy comparator 1520, a TBF monitor 1522, and a user interface setting receiver 1524.

The example message receiver 1502 receives messages sent to the mobile station 202 from the network 204. For example, the message receiver 1502 may receive messages that include one or more parameters that have been inserted by the non-DRX transceiver 227 of the BSC 220. The inserted parameters may be extracted by the parameter extractor 1504. For example, the parameter extractor 1504 may extract an indication from the network to indicate that the mobile station 202 is to use optimized DRX mode. The parameter extractor 1504 may store the parameters in the memory 243 and/or may make the parameters available to any other component of the non-DRX control module 207 for analysis.

The battery monitor 1506 analyzes to battery 232 of the mobile station 202 to determine a charge level of the battery 232. The battery monitor 1506 may perform measurements of the battery 232, may receive a measurement value, may access a stored measurement value, etc. The battery monitor 1506 may store the battery information in the memory 243 and/or may make the battery information available to any other component of the non-DRX control module 207 for analysis.

The push service detector 1508 determines when a push service is activated at the mobile station 202. For example, the push service detector 1508 may query the mobile station 202 and/or a component of the mobile station 202 to determine when push service is activated. Alternatively, the push service detector 1508 could monitor data usage at the mobile station 202 or access a stored setting, access a stored setting at the mobile station 202, or query the network 204 to determine when push service is activated. The push service detector 1508 may store the push service information in the memory 243 and/or may make the push service information available to any other component of the non-DRX control module 207 for analysis. While a push service detector 1508 is described, any service detector may be used. For example, any service detector that detects a service that uses a significant amount of data may be used.

The non-DRX timer 1510 of the non-DRX control module 207 is a timer to determine when the mobile station 202 should transition from non-DRX operation mode to DRX mode in packet idle mode. The non-DRX timer 1510 may time based on a setting at the mobile station 202, a setting received from the network 204, or any combination thereof. The non-DRX timer controller 1512 controls the operation of the non-DRX timer 1510. For example, the non-DRX timer controller 1512 may control the starting or stopping of the non-DRX timer 1510 and may control the duration of the non-DRX timer 1510. In addition, the non-DRX timer controller 1512 may cause a notification to be sent to the network 204 regarding the operation of the non-DRX timer 1510. For example, a notification may be sent indicating the duration of the non-DRX timer 1510 or when the non-DRX timer 1510 is started, stopped, or expires. The non-DRX timer controller 1512 may control the operation of the non-DRX timer 1510 based on the processes and state diagrams described herein. For example, the non-DRX timer controller 1512 may dynamically control the operation of the non-DRX timer 1510 based on information received from one or more of the message receiver 1502, the parameter extractor 1504, the battery monitor 1506, the push service detector 1508, the cell monitor 1514, the application monitor 1516, the dummy counter 1518, the dummy comparator 1520, the TBF monitor 1522, the user interface setting receiver 1524, or any other parameter extractor, retriever, or receiver.

The example cell monitor 1514 monitors the operation of the mobile station 202 in cell network such as the network 204. In the illustrated example, the cell monitor 1514 monitors for a change in the cell or a handover. A change in cell or a handover may indicate that the network capabilities or instructions regarding optimized DRX mode may need to be reanalyzed as shown in FIG. 12. The example cell monitor 1514 may additionally monitor the signal strength and requirements of the connected network to supplement the information obtained by the battery monitor 1506 with information about the power consumption of the RF transceiver 208. The cell monitor 1514 may monitor any other aspects of the network 204 that may be used to influence the operation of the non-DRX control module 207. The cell monitor 1514 may store the cell information in the memory 243 and/or may make the cell information available to any other component of the non-DRX control module 207 for analysis.

The example application monitor 1516 monitors applications executed at the mobile station 202 to determine the data usage characteristics of the applications. For example, the application monitor 1516 may monitor how frequently the applications connect to the data network, how long the connections last, etc. Additionally or alternatively, the application monitor 1516 may receive from the applications information about the data usage characteristics. For example, an application may identify itself as data intensive or as needing frequent or quick data connections. Additionally or alternatively, the application monitor 1516 may include a list of applications or types of application that includes characteristics of those applications or types of applications and may reference the list to determine the data requirements and characteristics of applications that are executed. The application monitor 1506 may store the application information in the memory 243 and/or may make the application information available to any other component of the non-DRX control module 207 for analysis.

The dummy counter 1518 operates in conjunction with the dummy comparator 1520 to count dummy packets received during a downlink TBF with the network 204 and to determine the number of received dummy packets exceeds a threshold. By counting the dummy packets and comparing to a threshold, the dummy counter 1518 and the dummy comparator 1520 can determine when the downlink TBF is operating in extended mode. For example, the dummy comparator 1520 may determine when the dummy counter 1518 has counted 2 dummy packets. The dummy comparator 1520 may store the dummy packet information in the memory 243 and/or may make the dummy packet information available to any other component of the non-DRX control module 207 for analysis.

The TBF monitor 1522 monitors TBF sessions between the mobile station 202 and the network 204. The example TBF monitor 1522 determines when a TBF session has been released by the network. In addition, the TBF monitor 1522 may determine what type of TBF session has been activated (e.g., uplink, downlink, extended uplink, extended downlink, etc.). The TBF monitor 1522 may store the TBF information in the memory 243 and/or may make the TBF information available to any other component of the non-DRX control module 207 for analysis.

The user interface setting receiver 1524 receives user setting information. For example, the user interface setting receiver 1524 may receive information input by a user using a user interface. The example user interface setting receiver 1524 receives user setting information indicative of a non-DRX operation setting desired by the user. For example, the user interface setting receiver 1524 may receive user information as shown in FIGS. 13 and 14. The user interface setting receiver 1524 may receive the user information from a user interface, may retrieve the user information from a setting stored in a memory (e.g., the memory 243), etc. The user interface setting receiver 1524 may store the user information in the memory 243 and/or may make the user information available to any other component of the non-DRX control module 207 for analysis.

While the foregoing describes example blocks that may implement the non-DRX control module 207, any combination of the described blocks may be used to implement the DRX control module 207. Any of the example blocks may be combined and/or blocks may be implemented by other components of the mobile station 202. For example, the non-DRX timer 1510 may be implemented by a timer of the mobile station 202.

Figure 16:
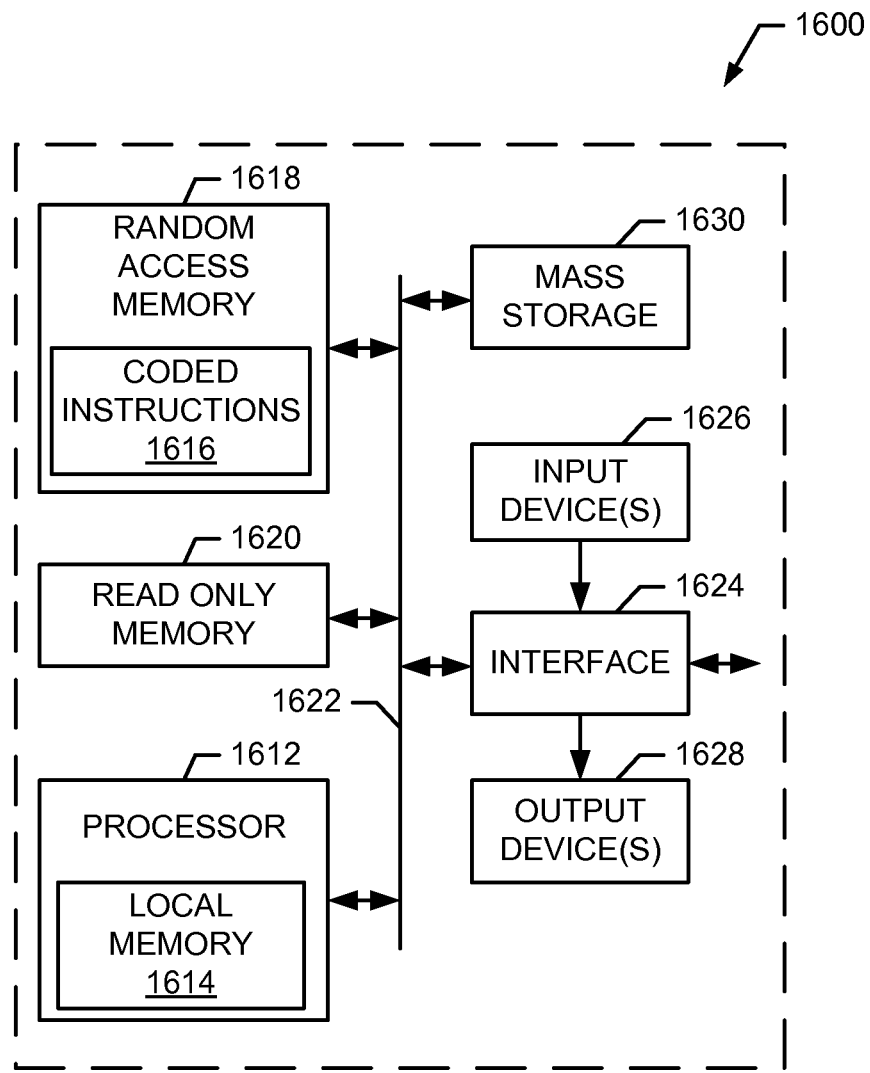
FIG. 16 is a block diagram of an example processing system capable of implementing the apparatus and methods disclosed herein.

FIG. 16 is a block diagram of an example processing system 1600 capable of implementing the apparatus and methods disclosed herein. The processing system 1600 can correspond to, for example, a mobile station processing platform, a network element processing platform, a server, a personal computer, a personal digital assistant (PDA), an Internet appliance, a mobile phone, or any other type of computing device. For example the processing system 1600 may implement the mobile station 102 and any component of the mobile communication networks 104.

The system 1600 of the instant example includes a processor 1612 such as a general purpose programmable processor, an embedded processor, a microcontroller, etc. The processor 1612 includes a local memory 1614, and executes coded instructions 1616 present in the local memory 1614 and/or in another memory device. The processor 1612 may execute, among other things, machine readable instructions to implement the processes represented in FIGS. 3, 5, 7, 8, 10, and 14. The processor 1612 may be any type of processing unit, such as one or more microprocessors from the Intel® Centrino® family of microprocessors, the Intel® Pentium® family of microprocessors, the Intel® Itanium® family of microprocessors, and/or the Intel® XScale®family of processors, one or more microcontrollers from the ARM® family of microcontrollers, the PIC® family of microcontrollers, etc. Of course, other processors from other families are also appropriate.

The processor 1612 is in communication with a main memory including a volatile memory 1618 and a non-volatile memory 1620 via a bus 1622. The volatile memory 1618 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1620 may be implemented by flash memory and/or any other desired type of memory device. Access to the main memory 1618, 1620 is typically controlled by a memory controller (not shown).

The computer 1600 also includes an interface circuit 1624. The interface circuit 1624 may be implemented by any type of interface standard, such as an Ethernet interface, a universal serial bus (USB), and/or a third generation input/output (3GIO) interface.

One or more input devices 1626 are connected to the interface circuit 1624. The input device(s) 1626 permit a user to enter data and commands into the processor 1612. The input device(s) can be implemented by, for example, a keyboard, a mouse, a touchscreen, a track-pad, a trackball, an isopoint, and/or a voice recognition system.

One or more output devices 1628 are also connected to the interface circuit 1624. The output devices 1628 can be implemented, for example, by display devices (e.g., a liquid crystal display, a cathode ray tube display (CRT)), by a printer and/or by speakers. The interface circuit 1624, thus, typically includes a graphics driver card.

The interface circuit 1624 also includes a communication device such as a modem or network interface card to facilitate exchange of data with external computers via a network (e.g., an Ethernet connection, a digital subscriber line (DSL), a telephone line, coaxial cable, a cellular telephone system such as an EGPRS-compliant system, etc.).

In some examples, the computer 1600 also includes one or more mass storage devices 1630 for storing software and data. Examples of such mass storage devices 1630 include floppy disk drives, hard drive disks, compact disk drives, memory cards, SIM cards, and digital versatile disk (DVD) drives.

As an alternative to implementing the methods and/or apparatus described herein in a system such as the device of FIG. 16, the methods and or apparatus described herein may be embedded in a structure such as a processor and/or an ASIC (application specific integrated circuit).

Finally, although certain example methods, apparatus, and articles of manufacture have been described herein, the scope of coverage of this disclosure is not limited thereto. On the contrary, this disclosure covers all methods, apparatus, and articles of manufacture fairly falling within the scope of the appended claims either literally or under the doctrine of equivalents.

What is claimed is:

1. A method in a mobile station for controlling discontinuous reception (DRX), the method comprising:
    entering a packet transfer mode;
    receiving a network message that indicates that the mobile station is to utilize an optimized DRX mode; and
    entering DRX mode immediately upon entering packet idle mode.

2. A method as defined in claim 1, wherein the network message is a control message associated with temporary block flow (TBF).

3. A method as defined in claim 1, further comprising setting a non-DRX mode period to zero.

4. A method as defined in claim 1, wherein the network message indicates that a non-DRX timer is to be set to zero.

5. A method as defined in claim 4, further comprising setting the non-DRX timer to zero.

6. A method as defined in claim 1, wherein the network message indicates that the network is operating in optimized DRX mode.

7. A method as defined in claim 1, wherein the network message indicates that the mobile station is to enter DRX mode immediately following release of a second TBF.

8. A method as defined in claim 1, wherein the network message is at least one of a packet downlink assignment message, a multiple TBF downlink assignment message, a packet uplink assignment message, or a packet timeslot reconfigure message.

9. A method as defined in claim 1, wherein the network message is at least one of an immediate assignment message, a dual transfer mode (DTM) assignment message, a packet assignment message, a packet circuit switched (CS) release indication message, a packet switched (PS) handover command, a DTM handover command, a packet uplink ACK/NACK message, or downlink radio link control (RLC) data blocks.

10. A method as defined in claim 1, further comprising entering packet idle mode in DRX mode upon leaving packet transfer mode.

11. A method as defined in claim 1, further comprising sending an indication of support for optimized DRX mode to a network device.

12. A mobile station comprising a process coupled to a memory, the processor configured to:
    enter a packet transfer mode;
    receive a network message that indicates that the mobile station is to utilize an optimized DRX mode; and
    enter DRX mode immediately upon entering packet idle mode.

13. A mobile station as defined in claim 12, wherein the network message is a control message associated with temporary block flow (TBF).

14. A mobile station as defined in claim 12, wherein the processor is configured to set a non-DRX mode period to zero.

15. A mobile station as defined in claim 12, wherein the network message indicates that a non-DRX timer is to be set to zero.

16. A mobile station as defined in claim 15, wherein the processor is configured to set the non-DRX timer to zero.

17. A mobile station as defined in claim 12, wherein the network message indicates that the network is operating in optimized DRX mode.

18. A mobile station as defined in claim 12, wherein the network message indicates that the mobile station is to enter DRX mode immediately following release of a second TBF.

19. A mobile station as defined in claim 12, wherein the network message is at least one of a packet downlink assignment message, a multiple TBF downlink assignment message, a packet uplink assignment message, or a packet timeslot reconfigure message.

* * * * *

UNITED STATES PATENT AND TRADEMARK OFFICE
CERTIFICATE OF CORRECTION

PATENT NO. : 8,442,025 B2  Page 1 of 1
APPLICATION NO. : 12/856273
DATED : May 14, 2013
INVENTOR(S) : Remo Borsella and Dinesh Kumar Arora It is certified that error appears in the above-identified patent and that said Letters Patent is hereby corrected as shown below:

In the Claims

Column 24, line 20, Claim 12: replace "process" with --processor--.

Signed and Sealed this
First Day of October, 2013

Teresa Stanek Rea
*Deputy Director of the United States Patent and Trademark Office*